(12) United States Patent
Minamiura et al.

(10) Patent No.: US 10,843,522 B2
(45) Date of Patent: Nov. 24, 2020

(54) VEHICLE COMPRISING AN ELECTRICAL STORAGE DEVICE COOLED BY A FAN

(71) Applicant: TOYOTA JIDOSHA KABUSHIKI KAISHA, Toyota (JP)

(72) Inventors: Keiichi Minamiura, Nagoya (JP); Yoshiaki Kikuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 470 days.

(21) Appl. No.: 14/906,408

(22) PCT Filed: Jul. 23, 2014

(86) PCT No.: PCT/IB2014/001375
§ 371 (c)(1),
(2) Date: Jan. 20, 2016

(87) PCT Pub. No.: WO2015/011550
PCT Pub. Date: Jan. 29, 2015

(65) Prior Publication Data
US 2016/0159194 A1 Jun. 9, 2016

(30) Foreign Application Priority Data

Jul. 24, 2013 (JP) ................................ 2013-154035
Apr. 11, 2014 (JP) ................................ 2014-082218

(51) Int. Cl.
*B60H 1/00* (2006.01)
*B60L 7/14* (2006.01)
(Continued)

(52) U.S. Cl.
CPC ..... *B60H 1/00278* (2013.01); *B60H 1/00392* (2013.01); *B60H 1/00828* (2013.01);
(Continued)

(58) Field of Classification Search
CPC ............ B60H 1/00278; B60H 1/00392; B60H 1/00828; B60H 1/00885; B60H 1/143;
(Continued)

(56) References Cited

U.S. PATENT DOCUMENTS 6,094,927 A * 8/2000 Anazawa ........... B60H 1/00278
62/239
8,662,968 B2 * 3/2014 Leffert ............... B60H 1/00278
165/42
(Continued)

FOREIGN PATENT DOCUMENTS

CN 1860045 A 11/2006
EP 2 067 640 A1 6/2009
(Continued)

*Primary Examiner* — Tho V Duong
*Assistant Examiner* — Raheena R Malik
(74) *Attorney, Agent, or Firm* — Sughrue Mion, PLLC

(57) ABSTRACT

When a device temperature (Tb) of an electrical storage device (10) is higher than or equal to a reference temperature, a fan (22) is driven at an air quantity larger than or equal to a reference air quantity. On the other hand, when the device temperature is lower than the reference temperature, air that has received heat from the electrical storage device is guided to a discharge chamber by driving the fan at an air quantity smaller than the reference air quantity on the basis of the fact that an air-conditioning system is operating and an outside air temperature is lower than or equal to a predetermined temperature. When the air-conditioning system is operating and the outside air temperature is lower than or equal to the predetermined temperature, it is assumed that there is a temperature difference between a passenger compartment and the discharge chamber. At this time, by driving the fan at the air quantity smaller than the reference air quantity, it is possible to bring the temperature of the discharge chamber close to the temperature of the passenger compartment by raising the temperature of the discharge
(Continued)

chamber, so it is possible to reduce the temperature difference between the discharge chamber and the passenger compartment.

12 Claims, 8 Drawing Sheets

(51) Int. Cl.

| | | |
|---|---|---|
| *B60L 1/00* | (2006.01) | |
| *B60L 58/21* | (2019.01) | |
| *B60L 50/60* | (2019.01) | |
| *B60L 58/26* | (2019.01) | |
| *B60L 50/51* | (2019.01) | |
| *B60H 1/14* | (2006.01) | |

(52) U.S. Cl.
CPC ......... *B60H 1/00885* (2013.01); *B60H 1/143* (2013.01); *B60L 1/003* (2013.01); *B60L 7/14* (2013.01); *B60L 50/51* (2019.02); *B60L 50/66* (2019.02); *B60L 58/21* (2019.02); *B60L 58/26* (2019.02); *B60H 2001/003* (2013.01); *B60L 2240/34* (2013.01); *B60L 2240/36* (2013.01); *B60L 2240/545* (2013.01); *Y02T 10/70* (2013.01)

(58) Field of Classification Search
CPC ... B60H 2001/003; B60L 50/66; B60L 58/21; B60L 50/51; B60L 58/26; B60L 1/003; B60L 7/14; B60L 2240/34; B60L 2240/224036; B60L 2240/545; Y02T 10/70
USPC ........................................................ 165/202
See application file for complete search history.

(56) References Cited

U.S. PATENT DOCUMENTS

| | | | | |
|---|---|---|---|---|
| 8,779,728 | B2* | 7/2014 | Zhou ................... | B60L 11/1809 320/150 |
| 8,978,803 | B2* | 3/2015 | Foos ................... | B60H 1/00278 180/68.1 |
| 9,174,520 | B2* | 11/2015 | Katayama ................ | B60K 1/04 |
| 9,283,826 | B2* | 3/2016 | Heckenberger .... | B60H 1/00278 |
| 2005/0138941 | A1* | 6/2005 | Kikuchi ............. | B60H 1/00278 62/178 |
| 2007/0089442 | A1* | 4/2007 | Tsuchiya ............ | B60H 1/00278 62/186 |
| 2008/0042615 | A1* | 2/2008 | Serrels ................... | B60L 1/003 320/101 |
| 2009/0088062 | A1* | 4/2009 | Major ................ | B60H 1/00278 454/70 |
| 2011/0016899 | A1* | 1/2011 | Ogura ................ | B60H 1/00278 62/239 |
| 2011/0042058 | A1* | 2/2011 | Kikuchi ............. | B60H 1/00278 165/287 |
| 2011/0199053 | A1* | 8/2011 | Minamiura ......... | H01M 10/441 320/136 |
| 2012/0234518 | A1* | 9/2012 | Brodie ............... | B60H 1/00278 165/104.31 |
| 2012/0312610 | A1 | 12/2012 | Kim et al. | |
| 2013/0122796 | A1* | 5/2013 | Lim ................... | B60H 1/00278 454/75 |
| 2015/0004449 | A1* | 1/2015 | Lim .................... | H01M 10/625 429/62 |
| 2015/0104680 | A1* | 4/2015 | Wang ................. | B60L 11/1874 429/50 |

FOREIGN PATENT DOCUMENTS

| | | |
|---|---|---|
| JP | 2012-210083 A | 10/2012 |
| JP | 2013-001382 A | 1/2013 |
| WO | 2005/092650 A1 | 10/2005 |

\* cited by examiner

VEHICLE COMPRISING AN ELECTRICAL STORAGE DEVICE COOLED BY A FAN

BACKGROUND OF THE INVENTION

1. Field of the Invention

The invention relates to a vehicle including a system that adjusts the temperature of an electrical storage device by supplying air to the electrical storage device.

2. Description of Related Art

In Japanese Patent Application Publication No. 2013-001382 (JP 2013-001382 A), a battery pack is cooled by supplying air in a cabin of a vehicle to the battery pack. Here, air after cooling the battery pack is discharged to a boot.

SUMMARY OF THE INVENTION

Depending on a vehicle, a space in which a passenger is seated (hereinafter, referred to as passenger compartment) and a boot communicate with each other, and air is allowed to move between the passenger compartment and the boot. Even in a vehicle in which a passenger compartment and a boot are partitioned from each other, a gap may occur at a portion that partitions the passenger compartment and the boot from each other, and air may move between the passenger compartment and the boot via the gap.

Here, as described in JP 2013-001382 A, if air after cooling the battery pack is discharged to the boot, air in the boot may flow into the passenger compartment. Specifically, air that has been present in the boot may be pushed out to the passenger compartment by air discharged to the boot.

If the temperature of the boot is different from the temperature of the passenger compartment, a passenger in the passenger compartment may experience a feeling of strangeness because of flow of air in the boot into the passenger compartment. For example, when the temperature of the boot is lower than the temperature of the passenger compartment, a passenger may perceive cold air because of flow of air in the boot into the passenger compartment. When the temperature of the boot is higher than the temperature of the passenger compartment, a passenger may experience a feeling of strangeness from warm air supplied from the boot because of flow of air in the boot into the passenger compartment.

A first aspect of the invention provides a vehicle. The vehicle includes an electrical storage device, a first temperature sensor, a second temperature sensor, a fan, an air-conditioning system, and a controller. The first temperature sensor is configured to detect a device temperature that is a temperature of the electrical storage device. The second temperature sensor is configured to detect an outside air temperature outside the vehicle. The fan is configured to supply air for adjusting the temperature of the electrical storage device to the electrical storage device. The fan is configured to discharge air, which has received heat from the electrical storage device, to a discharge chamber of the vehicle, movement of air being allowed between the discharge chamber and a passenger compartment of the vehicle. The air-conditioning system is configured to adjust a temperature of the passenger compartment. The controller is configured to control driving of the fan. The controller is configured to drive the fan to cool the electrical storage device such that an air quantity of the fan is larger than or equal to a reference air quantity when the device temperature is higher than or equal to a reference temperature. The controller is configured to drive the fan such that the air quantity of the fan is smaller than the reference air quantity when the device temperature is lower than the reference temperature, the air-conditioning system operates and the outside air temperature is lower than or equal to a predetermined temperature.

In the first aspect of the invention, air is allowed to move between the passenger compartment and the discharge chamber, so, if air is discharged to the discharge chamber by driving the fan at the air quantity larger than or equal to the reference air quantity, air that has been present in the discharge chamber may be pushed out to the passenger compartment. Here, when the fan is driven at the air quantity smaller than the reference air quantity, it is possible to reduce the quantity of air that is discharged to the discharge chamber, so it is possible to suppress a situation that air that has been present in the discharge chamber is pushed out to the passenger compartment.

The temperature of the discharge chamber is easily influenced by the outside air temperature, and the temperature of the passenger compartment is easily influenced by temperature adjustment by the air-conditioning system. When the air-conditioning system is operating, the temperature of the passenger compartment is usually a temperature comfortable to a passenger. In consideration of this point, in the first aspect of the invention, when the air-conditioning system is operating and the outside air temperature is lower than or equal to the predetermined temperature, it is assumed that the temperature of the discharge chamber is lower than the temperature of the passenger compartment and there is a temperature difference between the discharge chamber and the passenger compartment.

By guiding air, which has received heat from the electrical storage device, to the discharge chamber, it is possible to heat the discharge chamber by air that has received heat. Thus, it is possible to bring the temperature of the discharge chamber close to the temperature of the passenger compartment while suppressing a situation that air is pushed out from the discharge chamber to the passenger compartment. After the temperature of the discharge chamber has been brought close to the temperature of the passenger compartment, even when air flows from the discharge chamber into the passenger compartment, it is possible to suppress a feeling of strangeness, experienced by a passenger in the passenger compartment, due to a temperature difference.

When the device temperature is higher than or equal to the reference temperature, it is necessary to preferentially cool the electrical storage device, so the fan is driven at the air quantity larger than or equal to the reference air quantity. By driving the fan in this way, it is possible to increase the amount of air that is supplied to the electrical storage device, so it is possible to efficiently cool (adjust the temperature of) the electrical storage device. When the device temperature is lower than the reference temperature, it is possible to drive the fan at the air quantity smaller than the reference air quantity.

As the outside air temperature decreases, the temperature difference between the passenger compartment and the discharge chamber more easily increases, and a passenger more easily experiences a feeling of strangeness due to the temperature difference. Therefore, in the vehicle, the controller may be configured to reduce the air quantity of the fan as the outside air temperature decreases, when the fan is driven such that the air quantity of the fan is smaller than the reference air quantity. Thus, it is possible to bring the temperature of the discharge chamber close to the temperature of the passenger compartment by raising the temperature of the discharge chamber while making it easy to suppress air flowing from the discharge chamber into the passenger compartment.

In the vehicle, the air-conditioning system may be configured to be set an internal air circulation mode in which air in the passenger compartment is taken in and returned to the passenger compartment. The controller may be configured to drive the fan such that the air quantity of the fan is smaller than the reference air quantity when the device temperature is lower than the reference temperature, the air-conditioning system operates in the internal air circulation mode and the outside air temperature is lower than or equal to the predetermined temperature. In the internal air circulation mode, flow of air (cooled air) from the discharge chamber into the passenger compartment easily occurs because of a pressure difference between the passenger compartment and the discharge chamber. In this situation, as described above, it is desirable to reduce the temperature difference between the passenger compartment and the discharge chamber.

A second aspect of the invention provides a vehicle. The vehicle includes an electrical storage device, a first temperature sensor, a second temperature sensor, a fan, an air-conditioning system, and a controller. The first temperature sensor is configured to detect a device temperature that is a temperature of the electrical storage device. The second temperature sensor is configured to detect an outside air temperature outside the vehicle. The fan is configured to supply air for adjusting the temperature of the electrical storage device from the passenger compartment to the electrical storage device. The fan is configured to discharge air, which has passed through the electrical storage device, to a discharge chamber of the vehicle, movement of air being allowed between the discharge chamber and the passenger compartment. The air-conditioning system is configured to adjust a temperature of the passenger compartment. The controller is configured to control driving of the fan. The controller is configured to drive the fan to cool the electrical storage device such that an air quantity of the fan is larger than or equal to a reference air quantity when the device temperature is higher than or equal to a reference temperature. The controller is configured to drive the fan to guide air in the passenger compartment to the discharge chamber such that the air quantity of the fan is smaller than the reference air quantity when the device temperature is lower than the reference temperature, the air-conditioning system operates and the outside air temperature is higher than or equal to a predetermined temperature.

In the second aspect of the invention as well, air is allowed to move between the passenger compartment and the discharge chamber, so, if air is discharged to the discharge chamber by driving the fan at the air quantity larger than or equal to the reference air quantity, air that has been present in the discharge chamber may be pushed out to the passenger compartment. Here, when the fan is driven at the air quantity smaller than the reference air quantity, it is possible to suppress a situation that air that has been present in the discharge chamber is pushed out to the passenger compartment as in the case of the first aspect of the invention.

The temperature of the discharge chamber is easily influenced by the outside air temperature, and the temperature of the passenger compartment is easily influenced by temperature adjustment by the air-conditioning system. When the air-conditioning system is operating, the temperature of the passenger compartment is usually a temperature comfortable to a passenger. In consideration of this point, in the second aspect of the invention, when the air-conditioning system is operating and the outside air temperature is higher than or equal to the predetermined temperature, it is assumed that the temperature of the discharge chamber is higher than the temperature of the passenger compartment and there is a temperature difference between the discharge chamber and the passenger compartment.

By causing air in the passenger compartment to pass through the electrical storage device and guiding the air to the discharge chamber, it is possible to cool the discharge chamber by air in the passenger compartment of which the temperature is lower than the temperature of the discharge chamber. Thus, it is possible to bring the temperature of the discharge chamber close to the temperature of the passenger compartment while suppressing a situation that air is pushed out from the discharge chamber to the passenger compartment. After the temperature of the discharge chamber has been brought close to the temperature of the passenger compartment, even when air flows from the discharge chamber into the passenger compartment, it is possible to suppress a feeling of strangeness, experienced by a passenger in the passenger compartment, due to a temperature difference.

When the device temperature is higher than or equal to the reference temperature, it is possible to efficiently cool the electrical storage device by driving the fan at the air quantity larger than or equal to the reference air quantity as in the case of the first aspect of the invention. When the device temperature is lower than the reference temperature, it is possible to drive the fan at the air quantity smaller than the reference air quantity.

As the outside air temperature rises, the temperature difference between the passenger compartment and the discharge chamber more easily increases, and a passenger more easily experiences a feeling of strangeness due to the temperature difference. Therefore, in the vehicle, the controller may be configured to reduce the air quantity of the fan as the outside air temperature rises, when the fan is driven such that the air quantity of the fan is smaller than the reference air quantity. Thus, it is possible to bring the temperature of the discharge chamber close to the temperature of the passenger compartment by decreasing the temperature of the discharge chamber while making it easy to suppress air flowing from the discharge chamber into the passenger compartment.

In the vehicle, the air-conditioning system may be configured to be set an internal air circulation mode in which air in the passenger compartment is taken in and returned to the passenger compartment, and the controller may be configured to drive the fan such that the air quantity of the fan is smaller than the reference air quantity when the device temperature is lower than the reference temperature, the air-conditioning system operates in the internal air circulation mode and the outside air temperature is higher than or equal to the predetermined temperature. In the internal air circulation mode, flow of air (heated air) from the discharge chamber into the passenger compartment easily occurs because of a pressure difference between the passenger compartment and the discharge chamber. In this situation, as described above, it is desirable to reduce the temperature difference between the passenger compartment and the discharge chamber.

A third aspect of the invention provides a vehicle. The vehicle includes an electrical storage device, a temperature sensor, a fan, and a controller. The temperature sensor is configured to detect a temperature of the electrical storage device. The fan is configured to supply air for adjusting the temperature of the electrical storage device to the electrical storage device. The fan is configured to discharge air, which has received heat from the electrical storage device, to a discharge chamber of the vehicle, movement of air being allowed between the discharge chamber and a passenger compartment of the vehicle. The controller is configured to control driving of the fan. The controller is configured to drive the fan to cool the electrical storage device such that an air quantity of the fan is larger than or equal to a reference air quantity when the temperature of the electrical storage device is higher than or equal to a reference temperature. The controller is configured to drive the fan such that the air quantity of the fan is smaller than the reference air quantity when a temperature difference between the passenger compartment and the discharge chamber is larger than or equal to a predetermined difference in a case where the temperature of the electrical storage device is lower than the reference temperature and the temperature of the discharge chamber is lower than the temperature of the passenger compartment. The fan is similar to the fan in the first aspect of the invention. Air that has received heat from the electrical storage device is discharged to the discharge chamber, and air is allowed to move between the discharge chamber and the passenger compartment. When the temperature of the electrical storage device is higher than or equal to the reference temperature, the controller cools the electrical storage device by driving the fan at the air quantity larger than or equal to the reference air quantity. On the other hand, when the temperature of the electrical storage device is lower than the reference temperature, the controller drives the fan at the air quantity smaller than the reference air quantity on the basis of the fact that the temperature difference between the passenger compartment and the discharge chamber is larger than or equal to the predetermined difference. Here, the temperature difference is a temperature difference at the time when the temperature of the discharge chamber is lower than the temperature of the passenger compartment.

In the third aspect of the invention, the temperature difference between the passenger compartment and the discharge chamber is identified, and the fan is driven at the air quantity smaller than the reference air quantity when the temperature difference is larger than or equal to the predetermined difference. Thus, as in the case of the first aspect of the invention, it is possible to bring the temperature of the discharge chamber close to the temperature of the passenger compartment by raising the temperature of the discharge chamber while suppressing a situation that air is pushed out from the discharge chamber to the passenger compartment.

A fourth aspect of the invention provides a vehicle. The vehicle includes an electrical storage device, a temperature sensor, a fan, and a controller. The temperature sensor is configured to detect a temperature of the electrical storage device. The fan is configured to supply air for adjusting the temperature of the electrical storage device from the passenger compartment to the electrical storage device. The fan is configured to discharge air, which has passed through the electrical storage device, to a discharge chamber of the vehicle, movement of air being allowed between the discharge chamber and the passenger compartment. The controller is configured to control driving of the fan. The controller is configured to drive the fan to cool the electrical storage device such that an air quantity of the fan is larger than or equal to a reference air quantity when the temperature of the electrical storage device is higher than or equal to a reference temperature. The controller is configured to drive the fan to guide air in the passenger compartment to the discharge chamber such that the air quantity of the fan is smaller than the reference air quantity when a temperature difference between the passenger compartment and the discharge chamber is larger than or equal to a predetermined difference in a case where the temperature of the electrical storage device is lower than the reference temperature and the temperature of the discharge chamber is higher than the temperature of the passenger compartment. The fan supplies air from the passenger compartment to the electrical storage device. Air that has passed through the electrical storage device is discharged to the discharge chamber. When the temperature of the electrical storage device is higher than or equal to the reference temperature, the controller cools the electrical storage device by driving the fan at the air quantity larger than or equal to the reference air quantity. On the other hand, when the temperature of the electrical storage device is lower than the reference temperature, the controller guides air in the passenger compartment to the discharge chamber by driving the fan at the air quantity smaller than the reference air quantity on the basis of the fact that the temperature difference between the passenger compartment and the discharge chamber is larger than or equal to the predetermined difference. The temperature difference is a temperature difference at the time when the temperature of the discharge chamber is higher than the temperature of the passenger compartment.

In the fourth aspect of the invention, the temperature difference between the passenger compartment and the discharge chamber is identified, and the fan is driven at the air quantity smaller than the reference air quantity when the temperature difference is larger than or equal to the predetermined difference. Thus, as in the case of the second aspect of the invention, it is possible to bring the temperature of the discharge chamber close to the temperature of the passenger compartment by decreasing the temperature of the discharge chamber while suppressing a situation that air is pushed out from the discharge chamber to the passenger compartment.

In the vehicle, the controller may be configured to reduce the air quantity of the fan as the temperature difference increases, when the fan is driven such that the air quantity of the fan is smaller than the reference air quantity. As the temperature difference increases, a feeling of strangeness due to the temperature difference tends to be experienced by a passenger. Therefore, by reducing the air quantity of the fan as the temperature difference increases, it is possible to bring the temperature of the discharge chamber close to the temperature of the passenger compartment while making it easy to suppress air flowing from the discharge chamber to the passenger compartment.

The vehicle may include an air-conditioning system. The air-conditioning system may be configured to be set an internal air circulation mode in which air in the passenger compartment is taken in and returned to the passenger compartment, and may be configured to adjust the temperature of the passenger compartment. The air-conditioning system is allowed to be set in the internal air circulation mode in which air in the passenger compartment is taken in and returned to the passenger compartment. In the vehicle, the controller may be configured to drive the fan such that the air quantity of the fan is smaller than the reference air quantity when the temperature of the electrical storage device is lower than the reference temperature, the temperature difference is larger than or equal to the predetermined difference and the air-conditioning system is set in the internal air circulation mode.

As described above, when the internal air circulation mode is set, air easily flows from the discharge chamber into the passenger compartment. Therefore, in such a situation, with the third aspect or fourth aspect of the invention, the temperature of the discharge chamber is desirably brought close to the temperature of the passenger compartment.

In the vehicle, the discharge chamber may be a luggage compartment. In the vehicle, the discharge chamber may be a space between a vehicle body and an interior member arranged on an inner side of the vehicle body in the vehicle. The interior member is arranged on the inner side of the vehicle body in the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
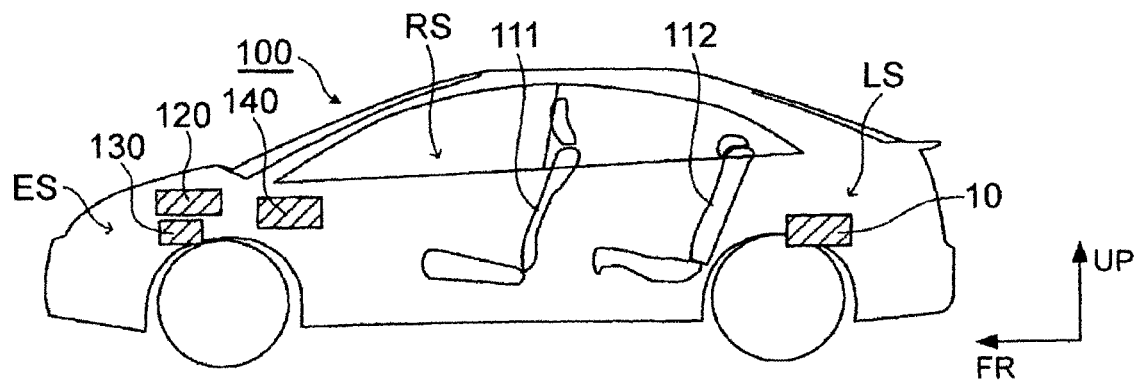
FIG. 1 is a view that schematically shows a vehicle.
Figure 2:
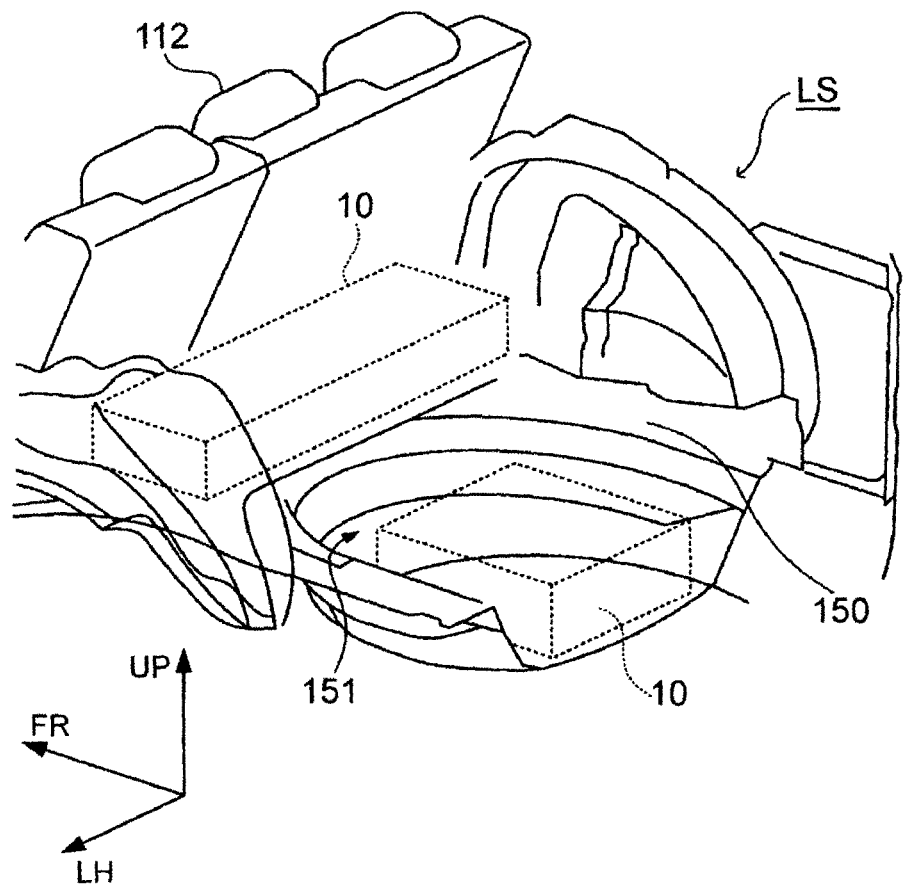
FIG. 2 is a view that illustrates a state where a battery pack is arranged in a luggage compartment.

A vehicle according to a first embodiment will be described with reference to FIG. 1 and FIG. 2. FIG. 1 is a schematic view that shows the configuration of the vehicle. FIG. 2 is a schematic view that shows the configuration of part of the vehicle. In FIG. 1 and FIG. 2, the arrow FR indicates a direction in which the vehicle 100 travels forward, and the arrow UP indicates an upward direction of the vehicle 100. In FIG. 2, the arrow LH indicates a leftward direction when oriented in the forward direction FR of the vehicle 100.

The vehicle 100 includes a passenger compartment RS, a luggage compartment LS and an engine compartment ES. The passenger compartment RS is a space in which a passenger is seated. Seats 111, 112 are arranged in the passenger compartment RS. The passenger compartment RS and the engine compartment ES are partitioned from each other by a dashboard provided in the vehicle 100.

The luggage compartment LS is a space in which a luggage, or the like, is arranged. The luggage compartment LS is located on the rear side of the passenger compartment RS in the vehicle 100. The luggage compartment LS communicates with the passenger compartment RS. Air is allowed to move between the luggage compartment LS and the passenger compartment RS. The luggage compartment LS and the passenger compartment RS may be partitioned by a cover mounted on the vehicle 100.

In the present embodiment, as shown in FIG. 2, the passenger compartment RS and the luggage compartment LS communicate with each other; however, the passenger compartment RS and the luggage compartment LS are not limited to this configuration. That is, even when the passenger compartment RS and the luggage compartment LS are partitioned from each other by the body of the vehicle 100, the invention is applicable. Even when the passenger compartment RS and the luggage compartment LS are partitioned from each other, a gap may be structurally formed at the partitioned portion. In this case, air may move between the passenger compartment RS and the luggage compartment LS via the gap.

A battery pack 10 is arranged in the luggage compartment LS. For example, as shown in FIG. 2, the battery pack 10 may be arranged along the back face of the seat 112 or the battery pack 10 may be accommodated in a recessed portion 151 of a floor panel 150. The floor panel 150 is part of the vehicle body. FIG. 2 shows two locations at which the battery pack 10 is arranged. Actually, the battery pack 10 may be arranged at any one of the two locations.

A location at which the battery pack 10 is arranged is not limited to the locations shown in FIG. 2. That is, it is only necessary to mount the battery pack 10 on the vehicle 100, and a location at which the battery pack 10 is mounted may be set as needed. Even when the battery pack 10 is arranged in the luggage compartment LS, the battery pack 10 may be arranged at a location different from the locations shown in FIG. 2. In the example shown in FIG. 2, the battery pack 10 is arranged in the luggage compartment LS; instead, the battery pack 10 may also be arranged in the passenger compartment RS.

The battery pack 10 outputs energy that is used to propel the vehicle 100. In FIG. 1, the battery pack 10 is connected to an inverter 120. Here, in response to switching of an ignition switch of the vehicle 100 from an off state to an on state, the battery pack 10 is connected to the inverter 120. Thus, the battery pack 10 switches from a non-energized state to an energized state.

The inverter 120 converts direct-current power, output from the battery pack 10, to alternating-current power, and outputs the alternating-current power to a motor generator 130. The motor generator 130 generates kinetic energy for causing the vehicle 100 to travel, upon reception of alternating-current power from the inverter 120. The kinetic energy generated by the motor generator 130 is transmitted to wheels.

The motor generator 130 converts kinetic energy, which is generated during braking of the vehicle 100, to electric energy (alternating-current power), and outputs the alternating-current power to the inverter 120. The inverter 120 converts alternating-current power, supplied from the motor generator 130, to direct-current power, and outputs the direct-current power to the battery pack 10. Thus, regenerative electric power is stored in the battery pack 10.

As shown in FIG. 1, the inverter 120 and the motor generator 130 are allowed to be arranged in the engine compartment ES. The engine compartment EC is located on the front side of the passenger compartment RS in the vehicle 100. In addition to the inverter 120 and the motor generator 130, an engine is also arranged in the engine compartment EC. Depending on the vehicle 100, the engine may be omitted or a fuel cell may be mounted instead of the engine.

An air-conditioning system 140 is arranged on the front side of the passenger compartment RS in the vehicle 100. The air-conditioning system 140 is used to adjust the temperature of the passenger compartment RS. It is allowed to operate the air-conditioning system 140 by passenger's operation of a switch provided in the air-conditioning system 140. The air-conditioning system 140 switches between an outside air introducing mode and an internal air circulation mode. For example, it is allowed to switch between the outside air introducing mode and the internal air circulation mode by passenger's operation of a switch provided in the air-conditioning system 140. When the outside air introducing mode is set, the air-conditioning system 140 introduces air, present outside the vehicle 100, to the passenger compartment RS. When the internal air circulation mode is set, the air-conditioning system 140 takes in air in the passenger compartment RS, and supplies the taken-in air to the passenger compartment RS again.

Next, the system that adjusts the temperature of the battery pack 10 will be described with reference to FIG. 3.

The battery pack 10 includes an assembled battery (which corresponds to an electrical storage device according to the invention) 11 and a pack case 12 that accommodates the assembled battery 11. The assembled battery 11 includes a plurality of single cells. The plurality of single cells may be electrically connected in series with each other or electrically connected in parallel with each other. A secondary battery, such as a nickel-metal hydride battery and a lithium ion battery, may be used as each single cell. Instead of the secondary battery, an electric double-layer capacitor may be used.

An intake duct 21 is connected to the pack case 12. An intake port 21*a* is provided at the distal end of the intake duct 21. The intake port 21*a* is used to take in air that is supplied to the assembled battery 11. Here, the intake port 21*a* is able to take in air present in the passenger compartment RS or the luggage compartment LS. Specifically, when the intake port 21*a* is exposed to the passenger compartment RS, the intake port 21*a* is allowed to take in air in the passenger compartment RS. When the intake port 21*a* is exposed to the luggage compartment LS, the intake port 21*a* is allowed to take in air in the luggage compartment LS.

A fan 22 is provided in the intake duct 21. The fan 22 operates upon reception of a drive signal from a controller 30. Here, the controller 30 includes a memory 30*a*. The memory 30*a* stores information for the controller 30 to execute a predetermined process. In the present embodiment, the memory 30*a* is incorporated in the controller 30; however, the memory 30*a* may be provided outside the controller 30.

When the fan 22 is driven, air is taken in from the intake port 21*a* to the inside of the intake duct 21. Air taken into the intake duct 21 is introduced to the inside of the pack case 12, and contacts the assembled battery 11. By bringing air into contact with the assembled battery 11, it is possible to adjust the temperature of the assembled battery 11. For example, when the assembled battery 11 generates heat through charging and discharging, or the like, it is possible to suppress a rise in the temperature of the assembled battery 11 by bringing air from the intake port 21*a* into contact with the assembled battery 11.

An exhaust duct 23 is connected to the pack case 12, and air after contacting the assembled battery 11 is guided to the exhaust duct 23. An exhaust port 23*a* is provided at the distal end of the exhaust duct 23. Air that has moved through the exhaust duct 23 is discharged from the exhaust port 23*a*. Air discharged from the exhaust port 23*a* is guided to the luggage compartment (which corresponds to a discharge chamber according to the invention) LS.

In the present embodiment, the fan 22 is provided in the intake duct 21; however, the invention is not limited to this configuration. Specifically, the fan 22 may be provided in at least one of the intake duct 21 and the exhaust duct 23. With this configuration, by driving the fan 22, it is possible to take in air from the intake port 21*a* and discharge air from the exhaust port 23*a*.

In the present embodiment, the intake duct 21 and the exhaust duct 23 are used; however, at least one of the intake duct 21 and the exhaust duct 23 may be omitted. When the intake duct 21 is omitted, air is allowed to be taken in through an open portion formed in the pack case 12. When the exhaust duct 23 is omitted, air is allowed to be discharged through an open portion formed in the pack case 12. Here, the fan 22 may be arranged inside the pack case 12.

A first temperature sensor 31 detects the temperature (battery temperature; which corresponds to a device temperature according to the invention) Tb of the assembled battery 11, and outputs the detected result to the controller 30. The controller 30 is able to control driving of the fan 22 on the basis of the detected result of the first temperature sensor 31. A second temperature sensor 32 detects the temperature (outside air temperature) Tout of outside air, and outputs the detected result to the controller 30. Outside air is air present outside the vehicle 100.

Next, the process of cooling the assembled battery 11 with the use of the system shown in FIG. 3 will be described with reference to the flowchart shown in FIG. 4. The process shown in FIG. 4 is executed while an ignition switch of the vehicle 100 is in an on state, and is executed by the controller 30.

In step S101, the controller 30 detects the battery temperature Tb on the basis of the output of the first temperature sensor 31. In step S102, the controller 30 determines whether the battery temperature Tb detected in the process of step S101 is higher than or equal to a reference temperature Tb_th. The reference temperature Tb_th is a temperature set in advance on the basis of the viewpoint of suppressing a rise in the temperature of the assembled battery 11. Information about the reference temperature Tb_th may be stored in the memory 30*a*.

When the battery temperature Tb is higher than or equal to the reference temperature Tb_th, the controller 30 determines that it is required to cool the assembled battery 11, and executes the process of step S103. In step S103, the controller 30 supplies cooling air to the assembled battery 11 by driving the fan 22, thus cooling the assembled battery 11. On the other hand, when the battery temperature Tb is lower than the reference temperature Tb_th, the controller 30 determines that it is not required to cool the assembled battery 11, and ends the process shown in FIG. 4. That is, when the battery temperature Tb is lower than the reference temperature Tb_th, the controller 30 does not drive the fan 22 to cool the assembled battery 11.

Figure 5:
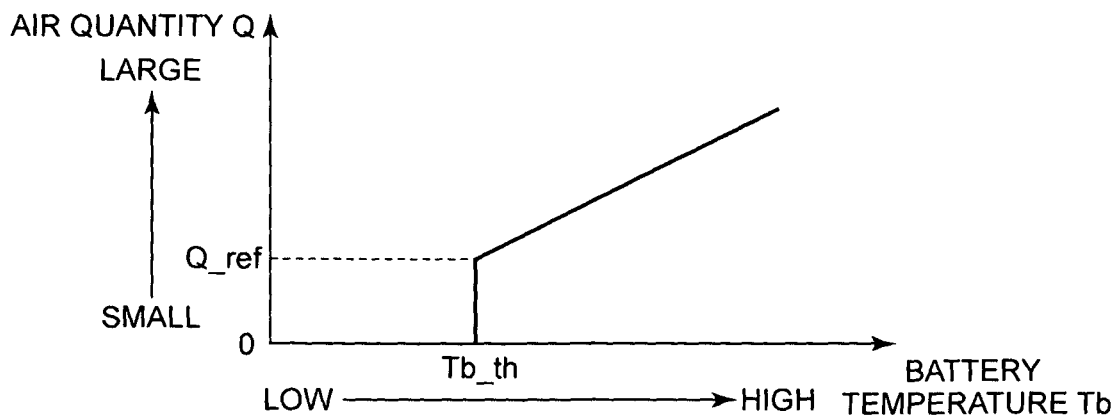
FIG. 5 is a graph that shows a correlation between a battery temperature and an air quantity of a fan.

In the process of step S103, the controller 30 is allowed to drive the fan 22 on the basis of the correlation shown in FIG. 5. FIG. 5 is a graph that shows the correlation between the battery temperature Tb and the air quantity Q of the fan 22. When the battery temperature Tb is the reference temperature Tb_th, the controller 30 sets the air quantity Q of the fan 22 to a reference air quantity Q_ref. The reference air quantity Q_ref is an air quantity Q set in advance on the basis of the viewpoint of ensuring the capability of cooling the assembled battery 11 at the reference temperature Tb_th, and may be set as needed. Here, when the battery temperature Tb is lower than the reference temperature Tb_th, the fan 22 does not operate to cool the assembled battery 11, and the air quantity Q is set to 0.

As the battery temperature Tb rises with respect to the reference temperature Tb_th, the controller 30 increases the air quantity Q of the fan 22 with respect to the reference air quantity Q_ref. As the battery temperature Tb rises with respect to the reference temperature Tb_th, it is required to improve the capability of cooling the assembled battery 11. Therefore, as the battery temperature Tb rises, a larger amount of air is easily supplied to the assembled battery 11 by increasing the air quantity Q of the fan 22, and a rise in the temperature of the assembled battery 11 is more easily suppressed. The correlation between the battery temperature Tb and the air quantity Q, shown in FIG. 5, may be set in advance on the basis of the viewpoint of ensuring the capability of cooling the assembled battery 11.

In the example shown in FIG. 5, when the battery temperature Tb is higher than the reference temperature Tb_th, the correlation between the battery temperature Tb and the air quantity Q varies linearly; however, the correlation between the battery temperature Tb and the air quantity Q is not limited to this configuration. That is, the correlation between the battery temperature Tb and the air quantity Q may be set as needed. For example, the correlation between the battery temperature Tb and the air quantity Q may vary along a curve. A region in which the air quantity Q is not changed even when the battery temperature Tb varies may be set.

The correlation shown in FIG. 5 may be set in advance as a map or a function. Information about the correlation may be stored in the memory 30a. Thus, the controller 30 is able to set the air quantity Q of the fan 22 to the air quantity Q corresponding to the battery temperature Tb by detecting the battery temperature Tb.

Figure 3:
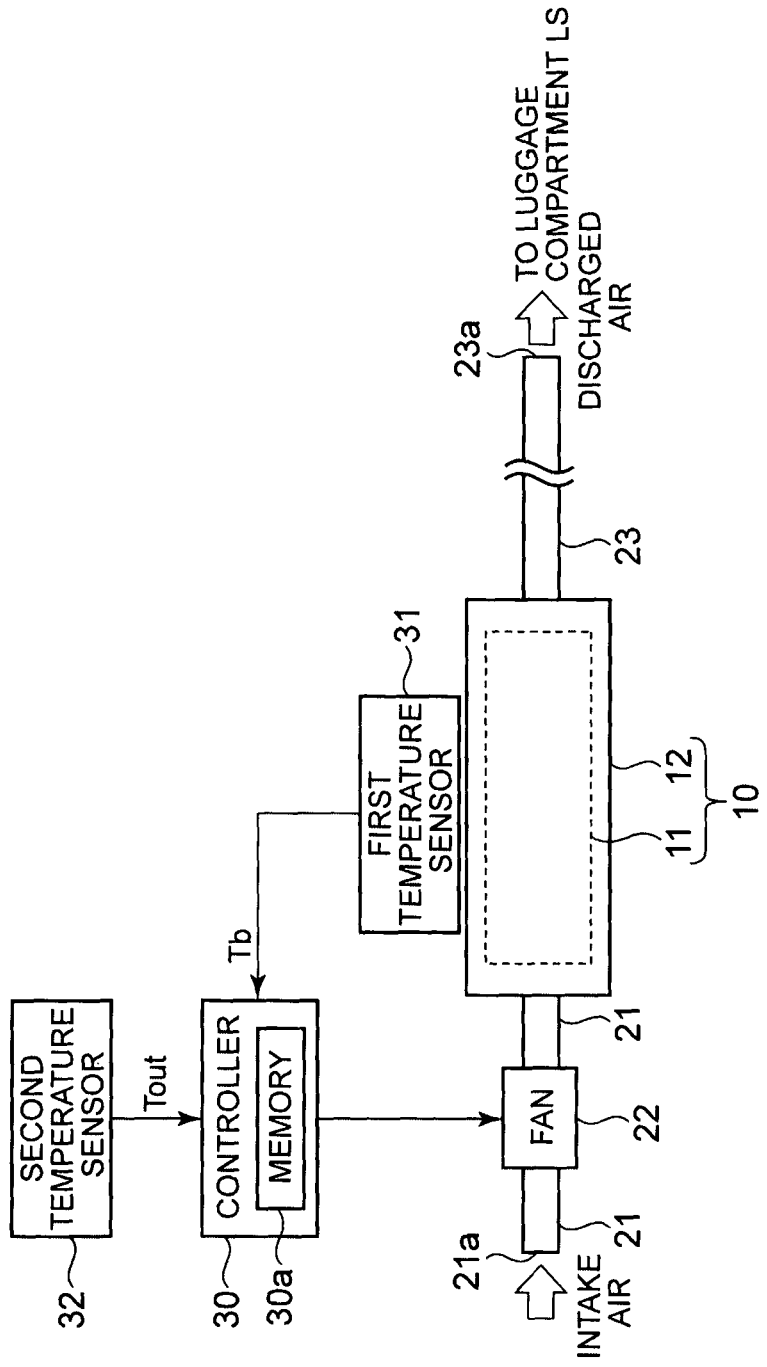
FIG. 3 is a view that shows a system that adjusts the temperature of the battery pack.
Figure 4:
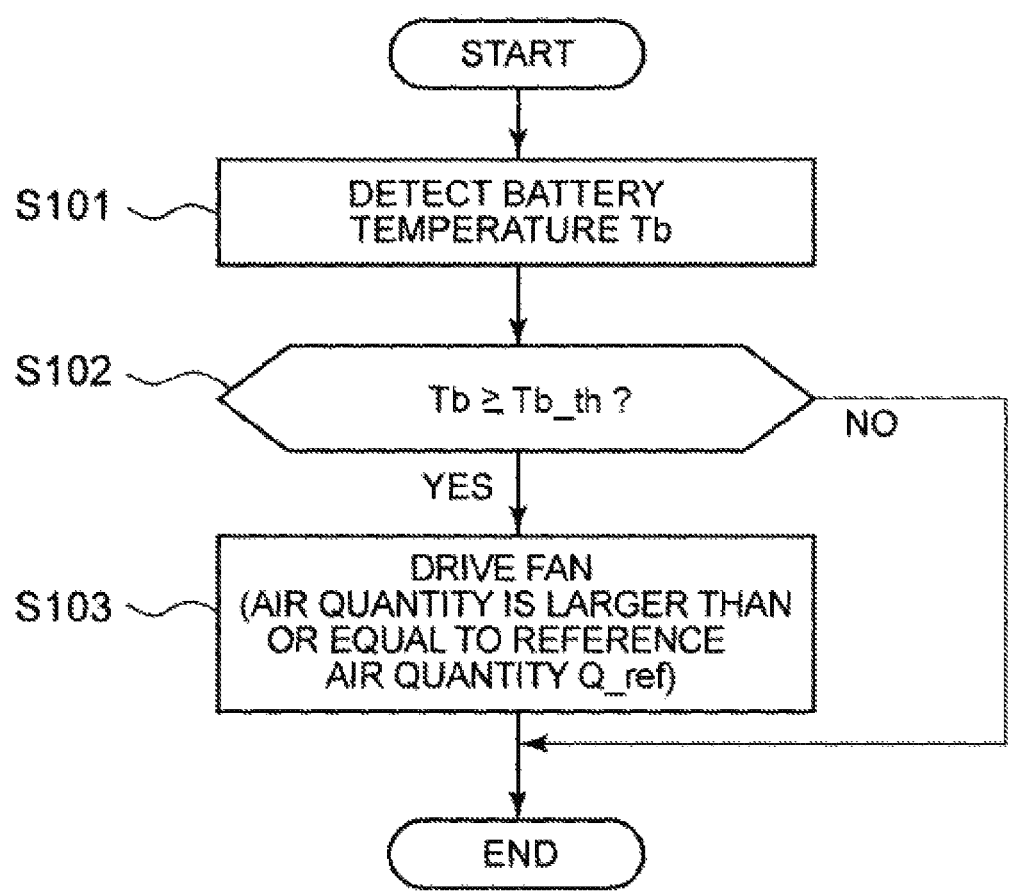
FIG. 4 is a flowchart that shows the process of adjusting the temperature of the battery pack.

In the system shown in FIG. 3, air discharged from the exhaust port 23a is guided to the luggage compartment LS. Here, air present in the luggage compartment LS may move to the passenger compartment RS because of air discharged from the exhaust port 23a. For example, air discharged from the exhaust port 23a may push air present in the luggage compartment LS into the passenger compartment RS.

When the vehicle 100 is not caused to travel and left standing, the temperature of the passenger compartment RS and the temperature of the luggage compartment LS become equal to each other, and become equal to the outside air temperature Tout. When air in the passenger compartment RS and air in the luggage compartment LS are cooled because of an external environment, or the like, a passenger usually raises the temperature of the passenger compartment RS by operating the air-conditioning system 140. In the luggage compartment LS, temperature adjustment by the air-conditioning system 140 is hard to work, the temperature of the luggage compartment LS is hard to rise, and tends to remain at the outside air temperature Tout.

There is no temperature difference between the passenger compartment RS and the luggage compartment LS immediately after the air-conditioning system 140 is operated; however, when the air-conditioning system 140 is continuously operated, only the temperature of the passenger compartment RS rises, and there occurs a temperature difference between the passenger compartment RS and the luggage compartment LS. When there is the temperature difference, if cooled air in the luggage compartment LS moves to the passenger compartment RS, a passenger present in the passenger compartment RS may experience a feeling of strangeness.

When the air-conditioning system 140 is set in the internal air circulation mode, air in the luggage compartment LS tends to move to the passenger compartment RS. When the internal air circulation mode is set, a difference in air pressure tends to occur between the passenger compartment RS and the luggage compartment LS, and air in the luggage compartment LS tends to move to the passenger compartment RS. Here, when the windows of the vehicle 100 are closed and the internal air circulation mode is set, the air pressure in the passenger compartment RS tends to decrease, and the air pressure in the passenger compartment RS tends to be lower than the air pressure in the luggage compartment LS.

Figure 6:
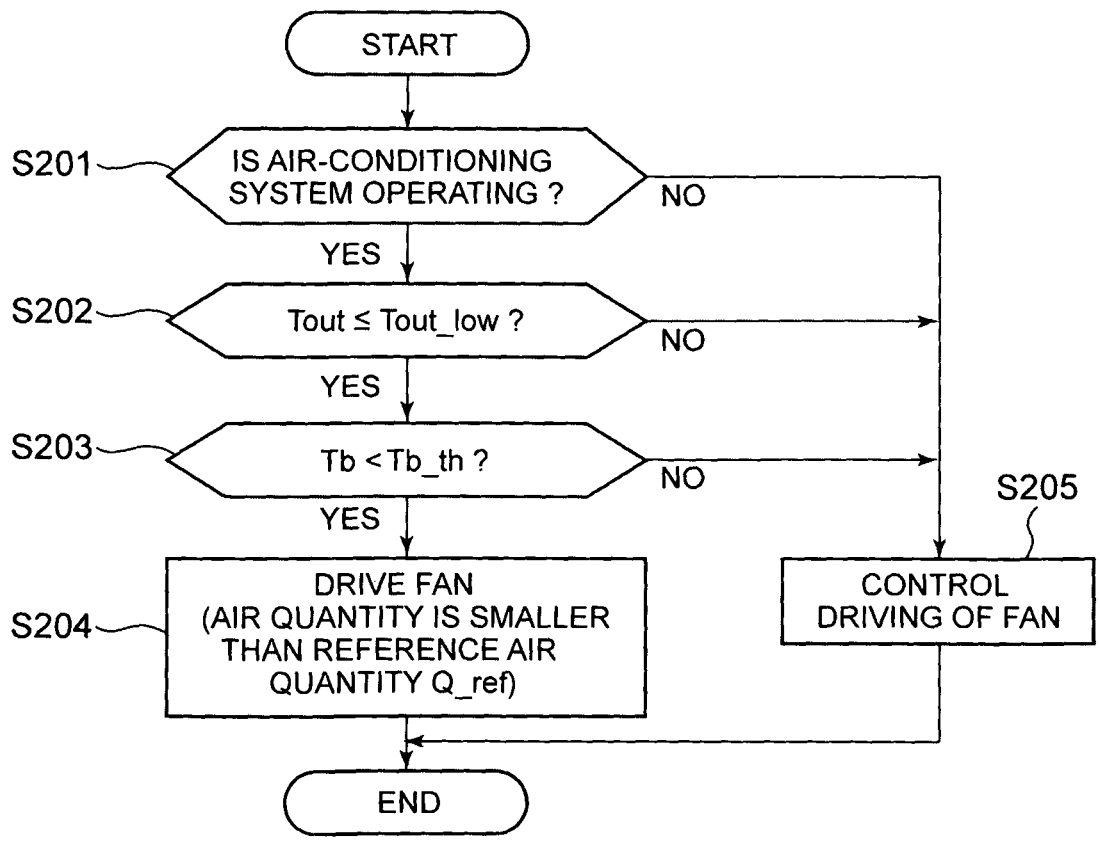
FIG. 6 is a flowchart that shows the process of controlling driving of the fan according to a first embodiment.

Therefore, in the present embodiment, by controlling driving of the fan 22, cold air in the luggage compartment LS is made hard to move to the passenger compartment RS, and a feeling of strangeness experienced by a passenger in the passenger compartment RS is suppressed. This process will be described with reference to the flowchart shown in FIG. 6. The process shown in FIG. 6 is executed by the controller 30.

In step S201, the controller 30 determines whether the air-conditioning system 140 is operating. The controller 30 is able to determine whether the air-conditioning system 140 is operating by checking the operation state of the switch provided in the air-conditioning system 140. When the air-conditioning system 140 is operating, the controller 30 executes the process of step S202. On the other hand, when the air-conditioning system 140 is not operating, the controller 30 executes the process of step S205.

In step S202, the controller 30 determines whether the outside air temperature Tout detected by the second temperature sensor 32 is lower than or equal to a predetermined temperature Tout_low. The predetermined temperature Tout_low is a temperature lower than a temperature that is assumed to be set in the air-conditioning system 140. When the temperature of the passenger compartment RS is adjusted by operating the air-conditioning system 140, a setting temperature of the air-conditioning system 140 is usually set to a temperature comfortable to a passenger. The setting temperature of the air-conditioning system 140 is automatically set by the air-conditioning system 140 or set by passenger's operation.

When the temperature comfortable to a passenger is estimated in advance, it is possible to set a temperature lower than the comfortable temperature is allowed to be set as the predetermined temperature Tout_low. The temperature that is estimated to be set in the air-conditioning system 140 may also be defined as a predetermined temperature range. A temperature lower than a lower limit temperature that defines the temperature range is allowed to be set as the predetermined temperature Tout_low. Information that specifies the predetermined temperature Tout_low may be stored in the memory 30a.

When the outside air temperature Tout is higher than the predetermined temperature Tout_low, the controller 30 executes the process of step S205. On the other hand, when the outside air temperature Tout is lower than or equal to the predetermined temperature Tout_low, the controller 30 determines in step S203 whether the battery temperature Tb detected by the first temperature sensor 31 is lower than the reference temperature Tb_th. When the battery temperature Tb is higher than or equal to the reference temperature Tb_th, the controller 30 executes the process of step S205.

On the other hand, when the battery temperature Tb is lower than the reference temperature Tb_th, the controller 30 drives the fan 22 at the air quantity Q smaller than the reference air quantity Q_ref in step S204. The air quantity Q at which the fan 22 is driven may be set in advance, and information that specifies the set air quantity Q may be stored in the memory 30a. In step S205, the controller 30 controls driving of the fan 22 on the basis of the process shown in FIG. 4.

According to the present embodiment, as described with reference to FIG. 4 and FIG. 5, when the battery temperature Tb is higher than or equal to the reference temperature Tb_th, the fan 22 is driven in order to execute the process of cooling the assembled battery 11. On the other hand, as described with reference to FIG. 6, even when the battery temperature Tb is lower than the reference temperature Tb_th but when the air-conditioning system 140 is operating and the outside air temperature Tout is lower than or equal to the predetermined temperature Tout_low, the fan 22 is driven.

In the process shown in FIG. 6, in a situation that the air-conditioning system 140 is operating and the outside air temperature Tout is lower than or equal to the predetermined temperature Tout_low, there occurs a temperature difference between the passenger compartment RS and the luggage compartment LS. When there occurs a temperature difference, the temperature difference is reduced by driving the fan 22 at the air quantity Q smaller than the reference air quantity Q_ref.

At the time of starting the process shown in FIG. 6, when the ignition switch is in the on state and the battery pack 10 (assembled battery 11) is in an energized state, heat is easily generated from the assembled battery 11. When heat stays in the assembled battery 11, the battery temperature Tb may be higher than the outside air temperature Tout.

When the fan 22 is driven, air taken in from the intake port 21a is heated upon reception of heat from the assembled battery 11 when passing through the battery pack 10. Air heated by the assembled battery 11 is discharged from the exhaust port 23a to the luggage compartment LS. Because the temperature of air discharged from the exhaust port 23a to the luggage compartment LS is higher than the temperature of air present in the luggage compartment LS, it is possible to heat the luggage compartment LS with air discharged to the luggage compartment LS. Thus, it is possible to bring the temperature of the luggage compartment LS close to the temperature of the passenger compartment RS that is heated by the air-conditioning system 140, so it is possible to reduce the temperature difference between the passenger compartment RS and the luggage compartment LS.

Because the air quantity Q of the fan 22 is smaller than the reference air quantity Q_ref, air discharged from the exhaust port 23a tends to stay in the luggage compartment LS. Thus, it becomes easy to heat the luggage compartment LS by using air discharged from the exhaust port 23a. In addition, when the air quantity Q of the fan 22 is smaller than the reference air quantity Q_ref, air in the luggage compartment LS is hard to move toward the passenger compartment RS even when air is discharged from the exhaust port 23a to the luggage compartment LS. Therefore, it is possible to suppress movement of air in the cold luggage compartment LS to the passenger compartment RS, so it is possible to suppress a feeling of strangeness experienced by a passenger in the passenger compartment RS.

In a state where air is hard to move from the luggage compartment LS to the passenger compartment RS, when the luggage compartment LS is heated in advance by using air discharged from the exhaust port 23a, air in the cooled luggage compartment LS does not move to the passenger compartment RS even when the fan 22 is driven at the air quantity Q larger than or equal to the reference air quantity Q_ref on the basis of the process shown in FIG. 4. That is, when the fan 22 is driven at the air quantity Q larger than or equal to the reference air quantity Q_ref, air in the heated luggage compartment LS just moves to the passenger compartment RS heated by the air-conditioning system 140, so a passenger in the passenger compartment RS is hard to experience a feeling of strangeness.

In the process shown in FIG. 6, when the air-conditioning system 140 is not operating, a temperature difference is hard to occur between the passenger compartment RS and the luggage compartment LS. Therefore, the process shown in FIG. 4 just needs to be executed. Similarly, when the outside air temperature Tout is higher than the predetermined temperature Tout_low, a temperature difference is hard to increase between the passenger compartment RS and the luggage compartment LS, and a passenger is hard to experience a feeling of strangeness even when air in the luggage compartment LS flows into the passenger compartment RS. Therefore, the process shown in FIG. 4 just needs to be executed. When the battery temperature Tb is higher than or equal to the reference temperature Tb_th, the process of cooling the assembled battery 11 (the process shown in FIG. 4) needs to be executed.

Figure 7:
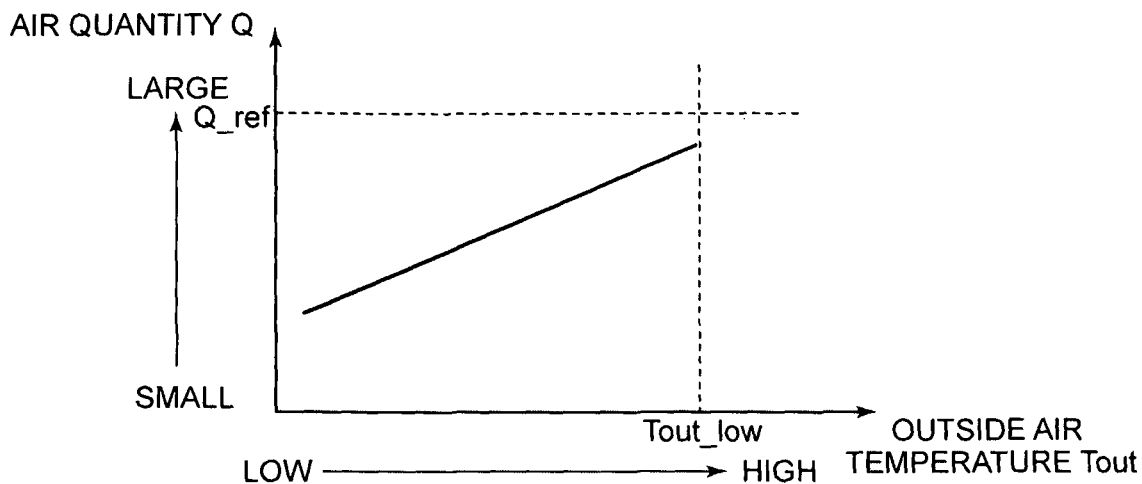
FIG. 7 is a graph that shows a correlation between an outside air temperature and an air quantity of the fan.

When the process of step S204 shown in FIG. 6 is executed, the air quantity Q of the fan 22 may be a predetermined fixed value or may be changed on the basis of the outside air temperature Tout. The case where the air quantity Q of the fan 22 is changed on the basis of the outside air temperature Tout will be described with reference to FIG. 7. FIG. 7 shows a correlation (one example) between an air-quantity Q and an outside air temperature Tout.

As shown in FIG. 7, when the outside air temperature Tout is lower than or equal to the predetermined temperature Tout_low, the air quantity Q is allowed to be reduced as the outside air temperature Tout decreases. As the outside air temperature Tout decreases, the temperature difference between the outside air temperature Tout and the predetermined temperature Tout_low, that is, the temperature difference between the passenger compartment RS and the luggage compartment LS, tends to increase. Thus, a passenger in the passenger compartment RS more easily experiences a feeling of strangeness due to the temperature difference between the passenger compartment RS and the luggage compartment LS.

As shown in FIG. 7, when the air quantity Q is reduced as the outside air temperature Tout decreases, it becomes easy to suppress flow of air from the luggage compartment LS into the passenger compartment RS when air is discharged from the exhaust port 23a to the luggage compartment LS. While flow of air from the luggage compartment LS into the passenger compartment RS is suppressed, it is possible to heat the luggage compartment LS by air discharged from the exhaust port 23a. Thus, it becomes easy to suppress the above-described feeling of strangeness experienced by a passenger in the passenger compartment RS.

In the example shown in FIG. 7, the correlation between the outside air temperature Tout and the air quantity Q varies linearly; however, the correlation is not limited to this configuration. That is, the correlation between the outside air temperature Tout and the air quantity Q may be set as needed. For example, the correlation between the outside air temperature Tout and the air quantity Q may vary along a curve. A region in which the air quantity Q is not changed even when the outside air temperature Tout varies may be provided.

When the fan 22 is driven by the process of step S204, a driving time of the fan 22 may be set as needed. For example, the driving time of the fan 22 may be determined in advance, and the fan 22 may be driven for the determined time. The driving time of the fan 22 may also be changed on the basis of the outside air temperature Tout. As described above, when the outside air temperature Tout is lower than or equal to the predetermined temperature Tout_low, as the outside air temperature Tout decreases, the temperature difference between the passenger compartment RS and the luggage compartment LS increases. To reduce the temperature difference, it is desirable to extend the driving time of the fan 22 as the temperature difference increases.

In consideration of this point, the driving time of the fan 22 may be changed on the basis of the outside air temperature Tout. That is, when the outside air temperature Tout is lower than or equal to the predetermined temperature Tout_low, the driving time of the fan 22 is extended as the outside air temperature Tout decreases. When the correlation between the outside air temperature Tout and the driving time of the fan 22 is determined in advance, it is possible to calculate the driving time of the fan 22, corresponding to the outside air temperature Tout. The correlation between the outside air temperature Tout and the driving time of the fan 22 may be expressed as a map or a function, and information about the correlation may be stored in the memory 30*a*.

In the process of step S201, it is determined whether the air-conditioning system 140 is operating; however, the process of step S201 is not limited to this configuration. Specifically, in the process of step S201, it may be determined whether the air-conditioning system 140 is set in the internal air circulation mode. When the internal air circulation mode is set, the process of step S202 is executed. When the internal air circulation mode is not set, that is, when the outside air introducing mode is set, the process of step S205 is executed.

As described above, when the internal air circulation mode is set, air in the luggage compartment LS tends to move to the passenger compartment RS. Therefore, when the internal air circulation mode is set and the outside air temperature Tout is lower than or equal to the predetermined temperature Tout_low, the process of step S204 is executed. Thus, it becomes easy to suppress a feeling of strangeness, experienced by a passenger, due to the temperature difference between the passenger compartment RS and the luggage compartment LS.

In the outside air introducing mode, cold outside air may be taken into the passenger compartment RS, so a passenger may be hard to experience a feeling of strangeness even when cold air in the luggage compartment LS flows into the passenger compartment RS. When the outside air introducing mode is set, an air pressure difference (air pressure difference between the passenger compartment RS and the luggage compartment LS) that occurs as a result of setting the internal air circulation mode is hard to occur, so cold air in the luggage compartment LS is hard to flow into the passenger compartment RS. Therefore, when the air-conditioning system 140 is set in the outside air introducing mode, it is just required to execute the process shown in FIG. 4.

In the process shown in FIG. 6, the case where the temperature of the luggage compartment LS is lower than the temperature of the passenger compartment RS is described; however, the invention is not limited to this case. Specifically, even when the temperature of the luggage compartment LS is higher than the temperature of the passenger compartment RS, the invention is applicable.

When the vehicle 100 is not caused to travel and left standing, the temperature of the passenger compartment RS and the temperature of the luggage compartment LS become equal to each other, and become equal to the outside air temperature Tout. When air in the passenger compartment RS and the luggage compartment LS is heated because of an external environment, or the like, a passenger usually decreases the temperature of the passenger compartment RS by operating the air-conditioning system 140. In the luggage compartment LS, temperature adjustment by the air-conditioning system 140 is hard to work, the temperature of the luggage compartment LS is hard to decrease, and tends to remain at the outside air temperature Tout.

There is no temperature difference between the passenger compartment RS and the luggage compartment LS immediately after the air-conditioning system 140 is operated; however, when the air-conditioning system 140 is continuously operated, only the temperature of the passenger compartment RS decreases, and there occurs a temperature difference between the passenger compartment RS and the luggage compartment LS. When there is the temperature difference, if heated air in the luggage compartment LS moves to the passenger compartment RS, a passenger present in the passenger compartment RS may experience a feeling of strangeness.

Figure 8:
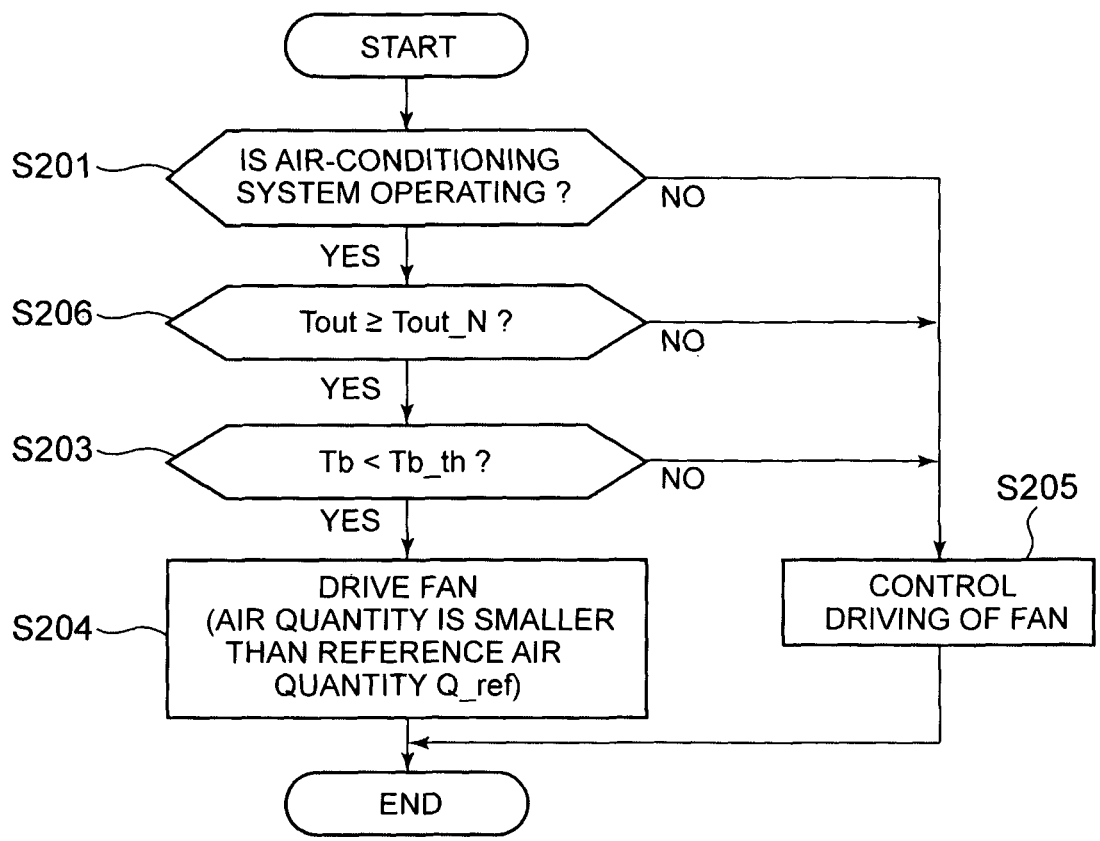
FIG. 8 is a flowchart that shows the process of controlling driving of the fan according to the first embodiment.

When the temperature difference between the passenger compartment RS and the luggage compartment LS is reduced, it is possible to suppress the above-described feeling of strangeness experienced by a passenger. The process of reducing the temperature difference between the passenger compartment RS and the luggage compartment LS will be described with reference to the flowchart shown in FIG. 8. FIG. 8 shows the process corresponding to FIG. 6. Like step numbers denote the same processes to the processes described with reference to FIG. 6, so the detailed description is omitted. When the process shown in FIG. 8 is executed, the intake port 21*a* is exposed to the passenger compartment RS in the system shown in FIG. 3.

When the air-conditioning system 140 is operating in the process of step S201, the controller 30 determines in step S206 whether the outside air temperature Tout detected by the second temperature sensor 32 is higher than or equal to a predetermined temperature Tout_hi. As described above, in the process of step S201, it may be determined whether the air-conditioning system 140 is set in the internal air circulation mode. When the internal air circulation mode is set, the process of step S206 may be executed.

The predetermined temperature Tout_hi is a temperature higher than a temperature that is assumed to be set in the air-conditioning system 140, and is a temperature higher than the predetermined temperature Tout_low described in the process of step S202 shown in FIG. 6. When the temperature of the passenger compartment RS is adjusted by operating the air-conditioning system 140, a setting temperature of the air-conditioning system 140 is usually set to a temperature comfortable to a passenger. When the temperature comfortable to a passenger is estimated in advance, it is possible to set a temperature higher than the comfortable temperature is allowed to be set as the predetermined temperature Tout_hi. The temperature that is estimated to be set in the air-conditioning system 140 may also be defined as a predetermined temperature range. A temperature higher than an upper limit temperature that defines the temperature range is allowed to be set as the predetermined temperature Tout_hi. Information that specifies the predetermined temperature Tout_hi may be stored in the memory 30a.

When the outside air temperature Tout is higher than or equal to the predetermined temperature Tout_hi, the controller 30 executes the process of step S203. On the other hand, when the outside air temperature Tout is lower than the predetermined temperature Tout_hi, the controller 30 executes the process of step S205.

In the process shown in FIG. 8, in a situation that the air-conditioning system 140 is operating and the outside air temperature Tout is higher than or equal to the predetermined temperature Tout_hi, there occurs a temperature difference between the passenger compartment RS and the luggage compartment LS. When there occurs a temperature difference, the temperature difference is reduced by driving the fan 22 at the air quantity Q smaller than the reference air quantity Q_ref.

In the system shown in FIG. 3, when the intake port 21a is exposed to the passenger compartment RS, it is possible to take in air in the passenger compartment RS cooled by the air-conditioning system 140 from the intake port 21a by driving the fan 22 while the air-conditioning system 140 is operating. Air taken in from the intake port 21a passes through the battery pack 10 (assembled battery 11) and moves to the exhaust port 23a.

In this way, when air in the passenger compartment RS is moved from the intake port 21a to the exhaust port 23a, the temperature of air that is discharged from the exhaust port 23a to the luggage compartment LS tends to be lower than the temperature of air present in the luggage compartment LS. Thus, it is possible to cool the luggage compartment LS by air discharged from the exhaust port 23a, so it is possible to reduce the temperature difference between the passenger compartment RS and the luggage compartment LS.

In the process of step S204 shown in FIG. 8, the air quantity Q of the fan 22 is smaller than the reference air quantity Q_ref, so air discharged from the exhaust port 23a tends to stay in the luggage compartment LS. Therefore, it becomes easy to cool the luggage compartment LS by air discharged from the exhaust port 23a. By setting the air quantity Q of the fan 22 such that the air quantity Q is smaller than the reference air quantity Q_ref, it is possible to suppress a situation that air in the luggage compartment LS is pushed out by air discharged from the exhaust port 23a to the passenger compartment RS.

In a state where air is hard to move from the luggage compartment LS to the passenger compartment RS, when the luggage compartment LS is cooled in advance by using air discharged from the exhaust port 23a, air in the heated luggage compartment LS does not move to the passenger compartment RS even when the fan 22 is driven at the air quantity Q larger than or equal to the reference air quantity Q_ref on the basis of the process shown in FIG. 4. That is, when the fan 22 is driven at the air quantity Q larger than or equal to the reference air quantity Q_ref, air in the cooled luggage compartment LS just moves to the passenger compartment RS cooled by the air-conditioning system 140, so a passenger in the passenger compartment RS is hard to experience a feeling of strangeness.

Figure 9:
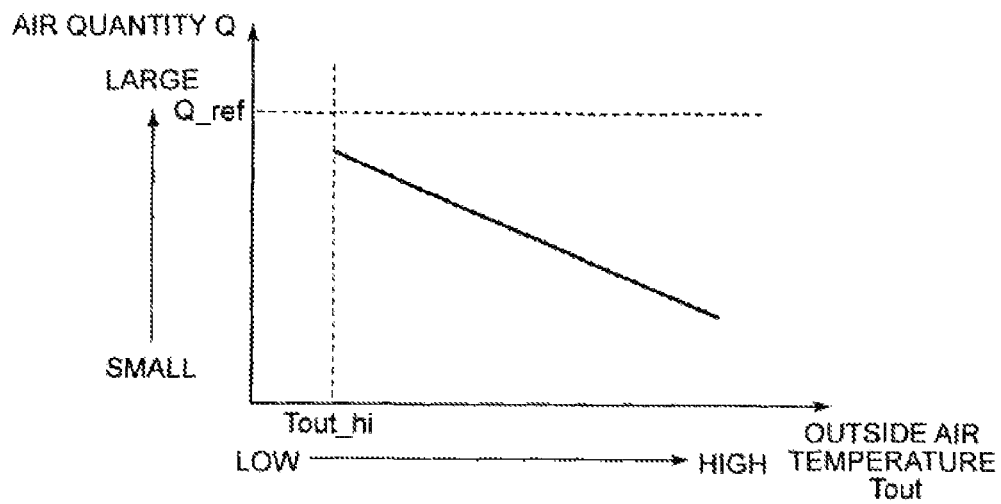
FIG. 9 is a graph that shows a correlation between an outside air temperature and an air quantity of the fan.

When the process of step S204 shown in FIG. 8 is executed, the air quantity Q of the fan 22 may be a predetermined fixed value or may be changed on the basis of the outside air temperature Tout. The case where the air quantity Q of the fan 22 is changed on the basis of the outside air temperature Tout will be described with reference to FIG. 9. FIG. 9 shows a correlation (one example) between an air quantity Q and an outside air temperature Tout.

As shown in FIG. 9, when the outside air temperature Tout is higher than or equal to the predetermined temperature Tout_hi, the air quantity Q is allowed to be reduced as the outside air temperature Tout rises. As the outside air temperature Tout rises, the temperature difference between the outside air temperature Tout and the predetermined temperature Tout_hi, that is, the temperature difference between the passenger compartment RS and the luggage compartment LS, tends to increase. Thus, a passenger in the passenger compartment RS more easily experiences a feeling of strangeness due to the temperature difference between the passenger compartment RS and the luggage compartment LS.

As shown in FIG. 9, when the air quantity Q is reduced as the outside air temperature Tout rises, it becomes easy to suppress flow of air from the luggage compartment LS into the passenger compartment RS when air is discharged from the exhaust port 23a to the luggage compartment LS. While flow of air from the luggage compartment LS into the passenger compartment RS is suppressed, it is possible to cool the luggage compartment LS by air discharged from the exhaust port 23a. Thus, it becomes easy to suppress the above-described feeling of strangeness experienced by a passenger in the passenger compartment RS.

In the example shown in FIG. 9, the correlation between the outside air temperature Tout and the air quantity Q varies linearly; however, the correlation is not limited to this configuration. That is, the correlation between the outside air temperature Tout and the air quantity Q may be set as needed. For example, the correlation between the outside air temperature Tout and the air quantity Q may vary along a curve. A region in which the air quantity Q is not changed even when the outside air temperature Tout varies may be provided.

A second embodiment of the invention will be described. In the present embodiment, like reference numerals denote the same components to those described in the first embodiment, and the detailed description is omitted. Hereinafter, a difference from the first embodiment will be mainly described.

Figure 10:
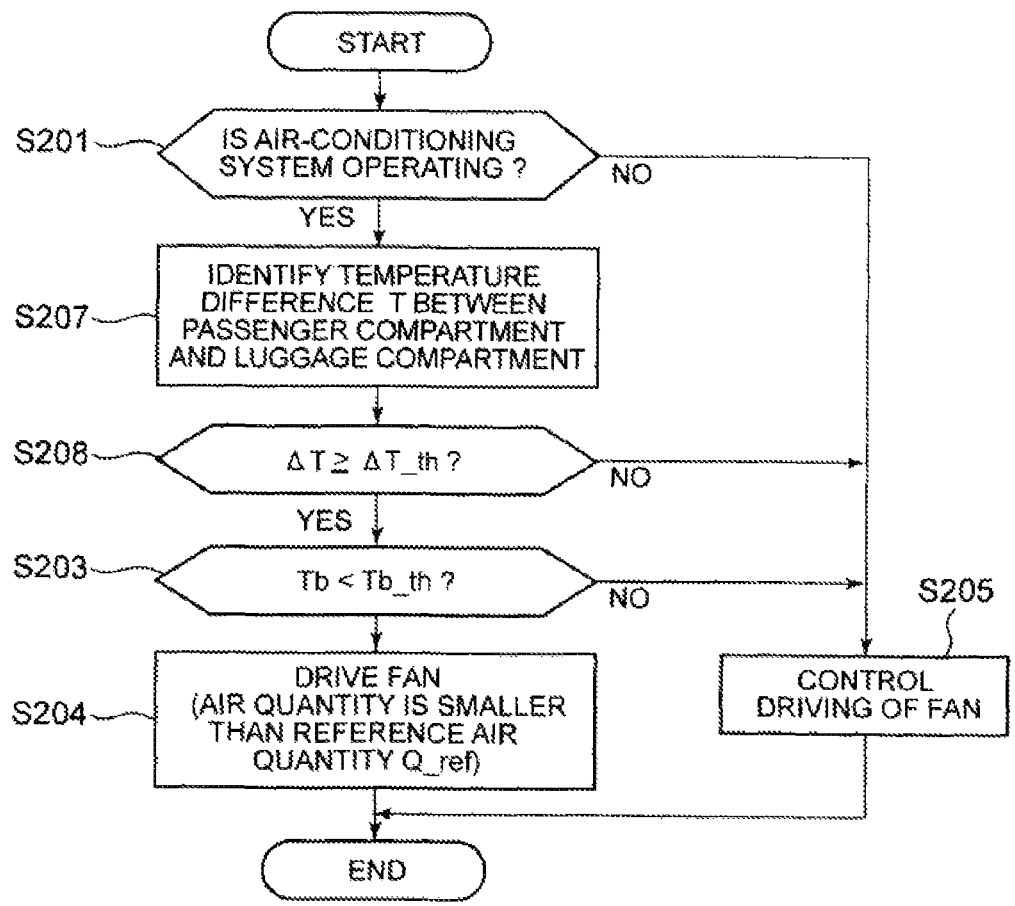
FIG. 10 is a flowchart that shows the process of controlling driving of the fan according to a second embodiment.

In the first embodiment, it is determined whether there occurs a temperature difference between the passenger compartment RS and the luggage compartment LS on the basis of the operation of the air-conditioning system 140 and the outside air temperature Tout. In the present embodiment, a temperature difference between the passenger compartment RS and the luggage compartment LS is identified, and driving of the fan 22 is controlled on the basis of the temperature difference. This process will be described with reference to the flowchart shown in FIG. 10. The process shown in FIG. 10 is executed by the controller 30. In FIG. 10, like step numbers denote the same processes as the processes described in FIG. 6, and the detailed description is omitted.

When it is determined in the process of step S201 that the air-conditioning system 140 is operating, the controller 30 identifies a difference (temperature difference) ΔT between the temperature of the passenger compartment RS and the temperature of the luggage compartment LS in step S207. In the process of step S201, it may be determined whether the air-conditioning system 140 is set in the internal air circulation mode. When the internal air circulation mode is set, the process of step S207 is executed. On the other hand, when the internal air circulation mode is not set, that is, when the outside air introducing mode is set, the process of step S205 may be executed.

Here, the temperature difference $\Delta T$ is a temperature difference at the time when the temperature of the luggage compartment LS is lower than the temperature of the passenger compartment RS. The controller 30 is able to estimate the temperature difference $\Delta T$ on the basis of the temperature set in the air-conditioning system 140 and the detected result (outside air temperature Tout) of the second temperature sensor 32. The temperature of the passenger compartment RS may be treated as the temperature set in the air-conditioning system 140. On the other hand, in the luggage compartment LS, temperature adjustment by the air-conditioning system 140 is hard to work, and the temperature of the luggage compartment LS is easily influenced by the outside air temperature Tout. Thus, the temperature of the luggage compartment LS may be treated as the outside air temperature Tout. Thus, a difference between the setting temperature in the air-conditioning system 140 and the outside air temperature Tout may be estimated as the temperature difference $\Delta T$. It is possible to acquire a high/low relationship between the temperature of the passenger compartment RS and the temperature of the luggage compartment LS on the basis of the setting temperature of the air-conditioning system 140 and the outside air temperature Tout.

A method of identifying the temperature difference $\Delta T$ is not limited to the above-described method. Specifically, the temperature of the passenger compartment RS and the temperature of the luggage compartment LS may be detected, and the temperature difference $\Delta T$ may be calculated on the basis of these detected results. In this case, a temperature sensor for detecting the temperature of the passenger compartment RS and a temperature sensor for detecting the temperature of the luggage compartment LS just need to be provided. Here, when the temperature of the luggage compartment LS is treated as the outside air temperature Tout, the temperature sensor for detecting the temperature of the luggage compartment LS is not required. When the temperature of the passenger compartment RS is detected, the process of step S201 shown in FIG. 10 may be omitted.

In step S208, the controller 30 determines whether the temperature difference $\Delta T$ identified in the process of step S207 is larger than or equal to a predetermined difference $\Delta T\_th$. The predetermined difference $\Delta T\_th$ may be set as needed on the basis of the viewpoint of a feeling of strangeness experienced by a passenger due to flow of air in the luggage compartment LS into the passenger compartment RS. Information about the predetermined difference $\Delta T\_th$ may be stored in the memory 30a.

When the temperature difference $\Delta T$ is larger than or equal to the predetermined difference $\Delta T\_th$, the controller 30 executes the process of step S203. On the other hand, when the temperature difference $\Delta T$ is smaller than the predetermined difference $\Delta T\_th$, the controller 30 executes the process of step S205.

Figure 11:
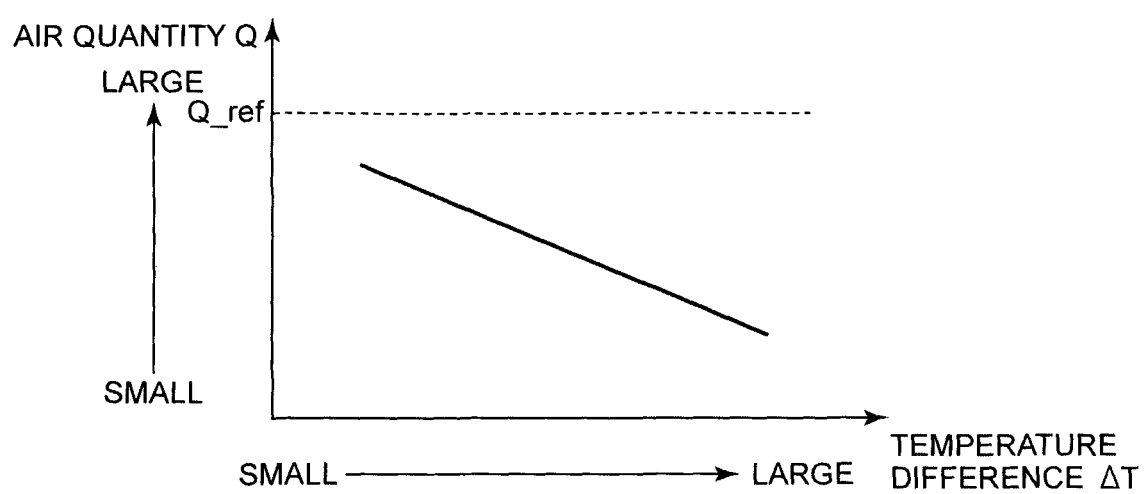
FIG. 11 is a graph that shows a correlation between a temperature difference and an air quantity of the fan.

When the process of step S204 shown in FIG. 10 is executed, the air quantity Q of the fan 22 may be a predetermined fixed value or may be changed on the basis of the temperature difference $\Delta T$. The case where the air quantity Q of the fan 22 is changed on the basis of the temperature difference $\Delta T$ will be described with reference to FIG. 11. FIG. 11 shows the correlation (one example) between the air quantity Q and the temperature difference $\Delta T$. The correlation shown in FIG. 11 may be determined in advance, and information about the correlation may be stored in the memory 30a. The correlation shown in FIG. 11 may be expressed as a map or a function.

According to the correlation shown in FIG. 11, as the temperature difference $\Delta T$ increases, the air quantity Q is reduced. Here, in the example shown in FIG. 11, the correlation between the temperature difference $\Delta T$ and the air quantity Q varies linearly; however, the correlation is not limited to this configuration. That is, the correlation between the temperature difference $\Delta T$ and the air quantity Q may be set as needed. For example, the correlation between the temperature difference $\Delta T$ and the air quantity Q may vary along a curve. A region in which the air quantity Q is not changed even when the temperature difference $\Delta T$ varies may be provided.

When the fan 22 is driven by the process of step S204 shown in FIG. 10, the driving time of the fan 22 may be set as needed. For example, the driving time of the fan 22 may be determined in advance, and the fan 22 may be driven for the determined time. The air quantity Q of the fan 22 may be changed on the basis of the temperature difference $\Delta T$. To reduce the temperature difference $\Delta T$, it is desirable to extend the driving time of the fan 22 as the temperature difference $\Delta T$ increases. In consideration of this point, the driving time of the fan 22 may be changed on the basis of the temperature difference $\Delta T$. Specifically, if the correlation between the temperature difference $\Delta T$ and the driving time of the fan 22 is determined in advance, it is possible to calculate the driving time corresponding to the temperature difference $\Delta T$ identified in the process of step S207. The correlation between the temperature difference $\Delta T$ and the driving time of the fan 22 may be expressed as a map or a function, and information about the correlation may be stored in the memory 30a.

According to the present embodiment, as described in the first embodiment (FIG. 4 and FIG. 5), the fan 22 is driven in order to execute the process of cooling the assembled battery 11 when the battery temperature Tb is higher than or equal to the reference temperature Tb\_th. As described with reference to FIG. 10, even when the battery temperature Tb is lower than the reference temperature Tb\_th and it is not required to execute the process of cooling the assembled battery 11, the fan 22 is driven on the basis of the temperature difference $\Delta T$. Here, when charging or discharging of the assembled battery 11 is started, usually, the battery temperature Tb is lower than the reference temperature Tb\_th. Therefore, when the temperature difference $\Delta T$ is larger than or equal to the predetermined difference $\Delta T\_th$, the fan 22 is driven on the basis of the temperature difference $\Delta T$ (the process of step S204 shown in FIG. 10) before the process of cooling the assembled battery 11 (the process shown in FIG. 4) is executed.

According to the present embodiment, when the temperature of the luggage compartment LS is lower than the temperature of the passenger compartment RS and the temperature difference $\Delta T$ is larger than or equal to the predetermined difference $\Delta T\_th$, it is possible to heat the luggage compartment LS by air discharged from the exhaust port 23a by driving the fan 22 as in the case of the first embodiment. Thus, it is possible to bring the temperature of the luggage compartment LS close to the temperature of the passenger compartment RS, so it is possible to suppress a feeling of strangeness, experienced by a passenger, due to a temperature difference between the luggage compartment LS and the passenger compartment RS.

Here, as described with reference to FIG. 11, as the temperature difference $\Delta T$ increases, the air quantity Q of the fan 22 is reduced. Thus, it is possible to suppress flow of air from the luggage compartment LS to the passenger compartment RS. As the temperature difference $\Delta T$ increases, a feeling of strangeness due to the temperature difference ΔT tends to be experienced by a passenger in the passenger compartment RS. Therefore, by making it easy to suppress flow of air from the luggage compartment LS to the passenger compartment RS by reducing the air quantity Q of the fan 22 as the temperature difference ΔT increases, it is possible to suppress a feeling of strangeness experienced by a passenger. While flow of air from the luggage compartment LS into the passenger compartment RS is suppressed, it is possible to heat the luggage compartment LS as described above.

In the process shown in FIG. 10, when the battery temperature Tb is higher than or equal to the reference temperature Tb_th, the process of cooling the assembled battery 11 (the process shown in FIG. 4) needs to be executed. When the temperature difference ΔT is smaller than the predetermined difference ΔT_th, a passenger is hard to experience a feeling of strangeness even when air in the luggage compartment LS flows into the passenger compartment RS. Therefore, the process shown in FIG. 4 just needs to be executed.

In the process shown in FIG. 10, it is determined whether the air-conditioning system 140 is operating; however, the determination process may be omitted. That is, in the process shown in FIG. 10, the process of step S201 may be omitted. Irrespective of whether the air-conditioning system 140 is operating, when air is discharged from the exhaust port 23a to the luggage compartment LS, air that has been present in the luggage compartment LS may be pushed out to the passenger compartment RS on the basis of the air quantity Q of the fan 22. In this case as well, by applying the present embodiment, it is possible to suppress a feeling of strangeness experienced by a passenger in the passenger compartment RS as described above.

In the present embodiment, the case where the temperature of the luggage compartment LS is lower than the temperature of the passenger compartment RS is described; however, the invention is not limited to this configuration. Specifically, even when the temperature of the luggage compartment LS is higher than the temperature of the passenger compartment RS, the invention is applicable. That is, in such a case as well, it is possible to execute the process shown in FIG. 10. When the process shown in FIG. 10 is executed, the intake port 21a is exposed to the passenger compartment RS in the system shown in FIG. 3.

The temperature difference ΔT that is identified in the process of step S207 shown in FIG. 10 is a temperature difference at the time when the temperature of the luggage compartment LS is higher than the temperature of the passenger compartment RS. A method of identifying the temperature difference ΔT is as described above. With the process shown in FIG. 10, when the temperature of the luggage compartment LS is higher than the temperature of the passenger compartment RS and the temperature difference ΔT is larger than or equal to the predetermined difference ΔT_th, the fan 22 is driven at the air quantity Q smaller than the reference air quantity Q_ref.

When air in the passenger compartment RS cooler than the luggage compartment LS is taken in from the intake port 21a, the taken-in air passes through the battery pack 10 (assembled battery 11) and moves to the exhaust port 23a. Thus, as in the case of the first embodiment, it is possible to cool the luggage compartment LS by using air that is discharged from the exhaust port 23a, so it is possible to bring the temperature of the luggage compartment LS close to the temperature of the passenger compartment RS.

The air quantity Q of the fan 22 is smaller than the reference air quantity Q_ref, so it becomes easy to cool the luggage compartment LS by air from the exhaust port 23a. In addition, by reducing the air quantity Q of the fan 22 below the reference air quantity Q_ref, it is possible to suppress a situation that air from the exhaust port 23a pushes out air in the luggage compartment LS toward the passenger compartment RS.

A third embodiment of the invention will be described. In the present embodiment, like reference numerals denote the same components to those described in the first or second embodiment, and the detailed description is omitted. Hereinafter, a difference from the first and second embodiments will be mainly described.

Figure 12:
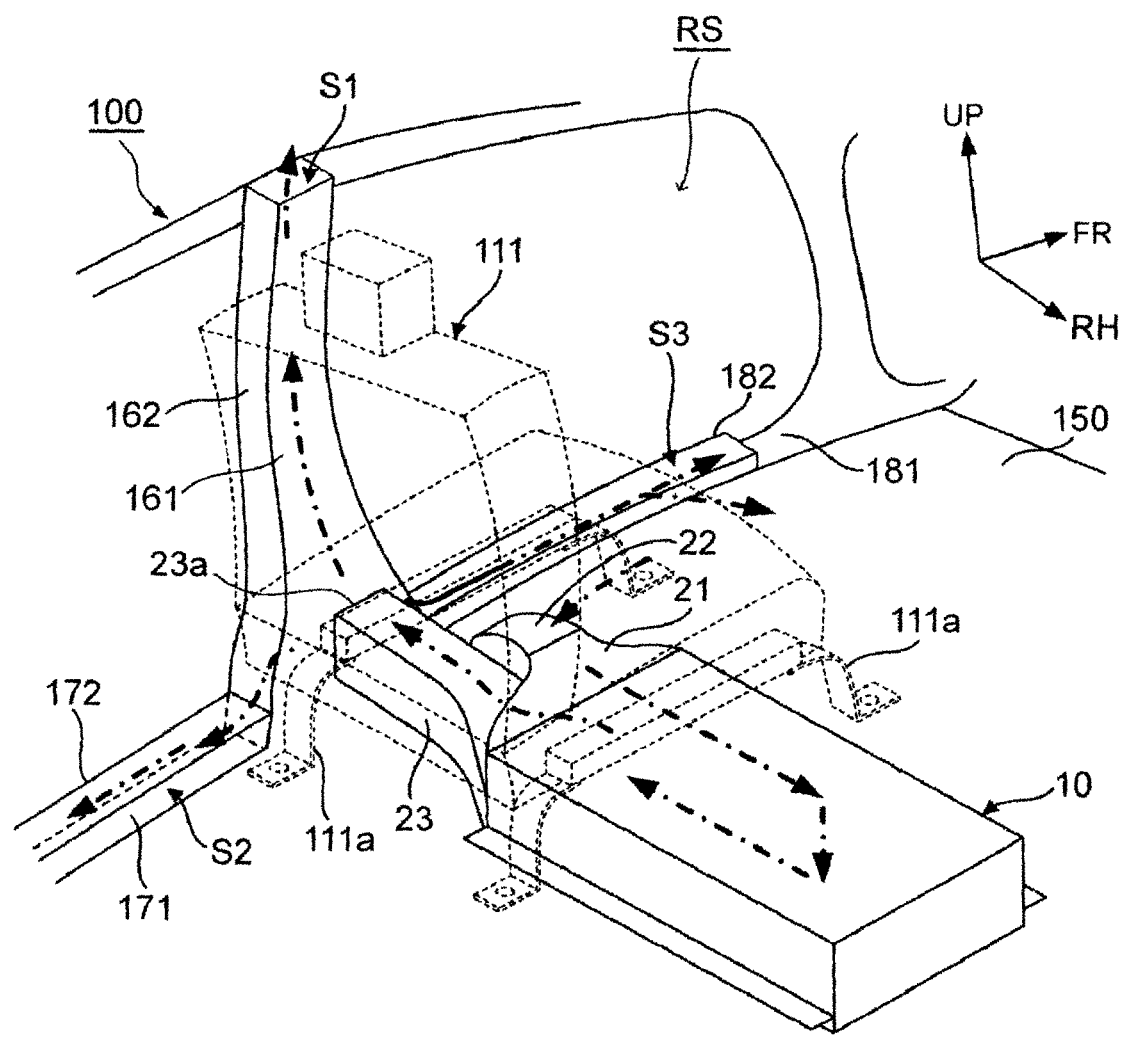
FIG. 12 is a view that shows a system that adjusts the temperature of the battery pack according to a third embodiment.

In the first embodiment, air discharged from the exhaust port 23a is guided to the luggage compartment LS; whereas, in the present embodiment, air discharged from the exhaust port 23a is guided to a space different from the luggage compartment LS. In the present embodiment, a system that adjusts the temperature of the battery pack 10 will be described with reference to FIG. 12. FIG. 12 is a schematic view that shows the configuration of part of the inside of the vehicle 100. In FIG. 12, the arrow RH indicates a rightward direction when oriented in the forward direction FR of the vehicle 100.

The battery pack 10 is arranged in the passenger compartment RS. Specifically, the battery pack 10 is fixed to the floor panel 150 in the passenger compartment RS. Part of the intake duct 21, exhaust duct 23 and battery pack 10 is arranged in a space formed between the seat 111 and the floor panel 150. Here, the seat 111 is fixed to the floor panel 150 via a seat rail 111a.

The arrows indicated by the alternate long and short dashed line in FIG. 12 indicate routes through which air flows when the fan 22 is driven. Air in the passenger compartment RS is taken in by the fan 22, passes through the intake duct 21, and is then guided to the battery pack 10. Air that has contacted the assembled battery of the battery pack 10 is guided to the exhaust duct 23.

The exhaust port 23a of the exhaust duct 23 is connected to a pillar garnish (which may be regarded as an interior member according to the invention) 161. A space (which may be regarded as a discharge chamber according to the invention) S1 is formed between the pillar garnish 161 and a pillar (which may be regarded as a vehicle body according to the invention) 162, and air discharged from the exhaust port 23a is guided to the space S1. Air guided to the space S1 moves upward of the vehicle 100 along the pillar garnish 161 and the pillar 162, and moves from the roof of the vehicle 100 to the passenger compartment RS. That is, air in the passenger compartment RS, taken in by the fan 22, passes through the battery pack 10 and the space S1, and then returns to the passenger compartment RS.

The space S1 communicates with spaces (which may be regarded as the discharge chamber according to the invention) S2, S3. Therefore, air that has entered from the exhaust port 23a into the space S1 is allowed to move to the spaces S2, S3. The space S2 is a space formed between a side sill 171 and a scuff plate 172, and is located on the rear side of the space S1 in the vehicle 100. The scuff plate 172 (which may be regarded as the interior member according to the invention) covers the upper face of the side sill 171 that is part of the vehicle body, and the space S2 is formed between the scuff plate 172 and the side sill 171.

The space S3 is a space formed between a side sill 181 and a scuff plate 182, and is located on the front side of the space S1 in the vehicle 100. The scuff plate (which may be regarded as the interior member according to the invention) 182 covers the upper face of the side sill 181 that is part of the vehicle body, and the space S3 is formed between the scuff plate 182 and the side sill 181.

Air that has moved from the exhaust port 23a to the space S2 moves along the space S2 and then moves to the passenger compartment RS. Air that has moved from the exhaust port. 23a to the space S3 moves along the space S3 and then moves to the passenger compartment RS.

The space S1 is partitioned from the passenger compartment RS by the pillar garnish 161 and the pillar 162. The temperature of the space S1 and the temperature of the passenger compartment RS can be different from each other. The space S2 is partitioned from the passenger compartment RS by the side sill 171 and the scuff plate 172. The temperature of the space S2 and the temperature of the passenger compartment RS can be different from each other. Similarly, the space S3 is partitioned from the passenger compartment RS by the side sill 181 and the scuff plate 182. The temperature of the space S3 and the temperature of the passenger compartment RS can be different from each other.

When the outside of the vehicle 100 is cold, the temperature of the spaces S1, S2, S3 tends to be lower than the temperature of the passenger compartment RS. The pillar 162 and the side sills 171, 181 that form the spaces S1, S2, S3 face the outside of the vehicle 100, so the temperature of the spaces S1, S2, S3 is easily influenced by an external environment. That is, when the outside of the vehicle 100 is cold, the spaces S1, S2, S3 tend to be cold. When the passenger compartment RS is heated by operating the air-conditioning system 140, the temperature of the spaces S1, S2, S3 tends to be lower than the temperature of the passenger compartment RS.

Here, if the fan 22 is driven through the process shown in FIG. 4 described in the first embodiment, cold air in the spaces S1, S2, S3 tends to enter the passenger compartment RS and there is a concern that a passenger experiences a feeling of strangeness. When the air-conditioning system 140 is set in the internal air circulation mode, cold air in the spaces S1, S2, S3 tends to enter the passenger compartment RS, and there is a concern that a passenger experiences a feeling of strangeness.

Therefore, in the present embodiment as well, by executing the process shown in FIG. 6 described in the first embodiment or by executing the process shown in FIG. 10 described in the second embodiment, it is possible to suppress entry of cold air into the passenger compartment RS. Here, when the process shown in FIG. 10 is executed, the controller 30 identifies the temperature difference ΔT between the temperature of the spaces S1, S2, S3 and the temperature of the passenger compartment RS in step S207.

The temperature difference ΔT may be calculated as in the case of the second embodiment. Specifically, the temperature set in the air-conditioning system 140 may be treated as the temperature of the passenger compartment RS. The outside air temperature Tout may be treated as the temperature of the spaces S1, S2, S3. Thus, a difference between the setting temperature in the air-conditioning system 140 and the outside air temperature Tout may be estimated as the temperature difference ΔT.

On the other hand, both the temperature of the passenger compartment RS and the temperature of the spaces S1, S2, S3 may be detected, and the temperature difference ΔT may be calculated on the basis of these detected results. In this case, a temperature sensor for detecting the temperature of the passenger compartment RS and a temperature sensor for detecting the temperature of the spaces S1, S2, S3 just need to be provided. When the temperature of the spaces S1, S2, S3 is treated as the outside air temperature Tout, the temperature sensor for detecting the temperature of the spaces S1, S2, S3 is not required.

When the temperature of the spaces S1, S2, S3 is lower than the temperature of the passenger compartment RS, it is possible to heat the spaces S1, S2, S3 by using air from the exhaust port 23a by executing a similar process to the process shown in FIG. 6. Here, because the air quantity Q of the fan 22 is smaller than the reference air quantity Q_ref when the spaces S1, S2, S3 are heated, it is possible to suppress movement of air from the spaces S1, S2, S3 to the passenger compartment RS.

When the spaces S1, S2, S3 are heated and then the fan 22 is driven through the process shown in FIG. 4, air in the heated spaces S1, S2, S3 moves to the passenger compartment RS. That is, it is possible to suppress movement of air in the cold spaces S1, S2, S3 to the passenger compartment RS, so it is possible to suppress a feeling of strangeness experienced by a passenger.

In the above description, the case where the temperature of the spaces S1, S2, S3 is lower than the temperature of the passenger compartment RS is described; however, when the temperature of the spaces S1, S2, S3 is higher than the temperature of the passenger compartment RS as well, the invention is applicable. As described in the first embodiment, the temperature of the spaces S1, S2, S3 can be higher than the temperature of the passenger compartment RS because of an external environment (summer, or the like).

In this case as well, by executing a similar process to the process shown in FIG. 8 or FIG. 10, it is possible to cool the spaces S1, S2, S3 by using air from the exhaust port 23a. In this case, the intake port 21a is exposed to the passenger compartment RS in the system shown in FIG. 3. Here, because the air quantity Q of the fan 22 is smaller than the reference air quantity Q_ref when the spaces S1, S2, S3 are cooled, it is possible to suppress movement of air from the spaces S1, S2, S3 to the passenger compartment RS.

When the spaces S1, S2, S3 are cooled and then the fan 22 is driven through the process shown in FIG. 4, air in the cooled spaces S1, S2, S3 moves to the passenger compartment RS. That is, it is possible to suppress movement of air in the heated spaces S1, S2, S3 to the passenger compartment RS, so it is possible to suppress a feeling of strangeness experienced by a passenger.

In the present embodiment, air that is discharged from the exhaust port 23a is guided to the spaces S1, S2, S3; however, the invention is not limited to this configuration. That is, with a configuration that air from the exhaust port 23a is guided to at least one of the spaces S1, S2, S3 as well, the invention is applicable.

In the present embodiment, air discharged from the exhaust port 23a is guided to the spaces S1, S2, S3; however, the invention is not limited to this configuration. That is, as long as air discharged from the exhaust port 23a is guided to a space (discharge chamber) different from the passenger compartment RS, the invention is applicable. Here, air just needs to be allowed to move between the discharge chamber and the passenger compartment RS.

The invention claimed is:
1. A vehicle comprising:
an electrical storage device;
a first temperature sensor configured to detect a device temperature that is a temperature of the electrical storage device;
a second temperature sensor configured to detect an outside air temperature outside the vehicle;

a fan configured to supply air for adjusting the temperature of the electrical storage device to the electrical storage device, the fan being configured to discharge air, which has received heat from the electrical storage device, to a discharge chamber of the vehicle, air being movable through a gap formed at a partition, the partition being formed between the discharge chamber and a passenger compartment of the vehicle;

an air-conditioning system configured to adjust a temperature of the passenger compartment; and a controller configured to:

(a) control driving of the fan, (b) drive the fan to cool the electrical storage device such that an air quantity of the fan is larger than or equal to a reference air quantity when the device temperature is higher than or equal to a reference temperature, and (c) drive the fan such that the air quantity of the fan is smaller than the reference air quantity when the device temperature is lower than the reference temperature, the air-conditioning system operates and the outside air temperature is lower than or equal to a predetermined temperature, wherein the predetermined temperature is less than a temperature set by the air-conditioning system.

2. The vehicle according to claim 1, wherein
the controller is configured to reduce the air quantity of the fan as the outside air temperature decreases, when the fan is driven such that the air quantity of the fan is smaller than the reference air quantity.

3. The vehicle according to claim 1, wherein
the air-conditioning system is configured to be set an internal air circulation mode in which air in the passenger compartment is taken in and returned to the passenger compartment, and
the controller is configured to drive the fan such that the air quantity of the fan is smaller than the reference air quantity when the device temperature is lower than the reference temperature, the air-conditioning system operates in the internal air circulation mode and the outside air temperature is lower than or equal to the predetermined temperature.

4. The vehicle according to claim 1, wherein
the discharge chamber is a luggage compartment.

5. The vehicle according to claim 1, wherein
the discharge chamber is a space between a vehicle body and an interior member arranged on an inner side of the vehicle body in the vehicle.

6. A vehicle comprising:
an electrical storage device;
a first temperature sensor configured to detect a device temperature that is a temperature of the electrical storage device;
a second temperature sensor configured to detect an outside air temperature outside the vehicle;
a fan configured to supply air for adjusting the temperature of the electrical storage device from a passenger compartment of the vehicle to the electrical storage device, the fan being configured to discharge air, which has passed through the electrical storage device, to a discharge chamber of the vehicle, air being movable through a gap formed at a partition, the partition being formed between the discharge chamber and the passenger compartment;
an air-conditioning system configured to adjust a temperature of the passenger compartment; and a controller configured to:

(d) control driving of the fan, (e) drive the fan to cool the electrical storage device such that an air quantity of the fan is larger than or equal to a reference air quantity when the device temperature is higher than or equal to a reference temperature, and (f) drive the fan to guide air in the passenger compartment to the discharge chamber such that the air quantity of the fan is smaller than the reference air quantity when the device temperature is lower than the reference temperature, the air-conditioning system operates and the outside air temperature is higher than or equal to a predetermined temperature, wherein the predetermined temperature is greater than a temperature set by the air-conditioning system.

7. The vehicle according to claim 6, wherein
the controller is configured to reduce the air quantity of the fan as the outside air temperature rises, when the fan is driven such that the air quantity of the fan is smaller than the reference air quantity.

8. The vehicle according to claim 6, wherein
the air-conditioning system is configured to be set an internal air circulation mode in which air in the passenger compartment is taken in and returned to the passenger compartment, and
the controller is configured to drive the fan such that the air quantity of the fan is smaller than the reference air quantity when the device temperature is lower than the reference temperature, the air-conditioning system operates in the internal air circulation mode and the outside air temperature is higher than or equal to the predetermined temperature.

9. A vehicle comprising:
an electrical storage device;
a temperature sensor configured to detect a temperature of the electrical storage device;
a fan configured to supply air for adjusting the temperature of the electrical storage device to the electrical storage device, the fan being configured to discharge air, which has received heat from the electrical storage device, to a discharge chamber of the vehicle, air being movable through a gap formed at a partition, the partition being formed between the discharge chamber and a passenger compartment of the vehicle; and a controller configured to:

(g) control driving of the fan, (h) drive the fan to cool the electrical storage device such that an air quantity of the fan is larger than or equal to a reference air quantity when the temperature of the electrical storage device is higher than or equal to a reference temperature, (i) drive the fan such that the air quantity of the fan is smaller than the reference air quantity when a temperature difference between the passenger compartment and the discharge chamber is larger than or equal to a predetermined difference in a case where the temperature of the electrical storage device is lower than the reference temperature and the temperature of the discharge chamber is lower than the temperature of the passenger compartment, and based on the temperature difference between the passenger compartment and the discharge chamber, drive the fan such that the temperature difference is reduced.

10. The vehicle according to claim 9, wherein
the controller is configured to reduce the air quantity of the fan as the temperature difference increases, when the fan is driven such that the air quantity of the fan is smaller than the reference air quantity.

11. The vehicle according to claim 9, further comprising:
an air-conditioning system configured to be set an internal air circulation mode in which air in the passenger compartment is taken in and returned to the passenger compartment, and configured to adjust the temperature of the passenger compartment, wherein
the controller is configured to drive the fan such that the air quantity of the fan is smaller than the reference air quantity when the temperature of the electrical storage device is lower than the reference temperature, the temperature difference is larger than or equal to the predetermined difference and the air-conditioning system is set in the internal air circulation mode.

12. A vehicle comprising:
an electrical storage device;
a temperature sensor configured to detect a temperature of the electrical storage device;
a fan configured to supply air for adjusting the temperature of the electrical storage device from a passenger compartment of the vehicle to the electrical storage device, the fan being configured to discharge air, which has passed through the electrical storage device, to a discharge chamber of the vehicle, air being movable through a gap formed at a partition, the partition being formed between the discharge chamber and the passenger compartment; and
a controller configured to:
(j) control driving of the fan,
(k) drive the fan to cool the electrical storage device such that an air quantity of the fan is larger than or equal to a reference air quantity when the temperature of the electrical storage device is higher than or equal to a reference temperature,
(l) drive the fan to guide air in the passenger compartment to the discharge chamber such that the air quantity of the fan is smaller than the reference air quantity when a temperature difference between the passenger compartment and the discharge chamber is larger than or equal to a predetermined difference in a case where the temperature of the electrical storage device is lower than the reference temperature and the temperature of the discharge chamber is higher than the temperature of the passenger compartment, and
based on the temperature difference between the passenger compartment and the discharge chamber, drive the fan such that the temperature difference is reduced.

* * * * *